US011543688B2

(12) United States Patent
Freude et al.

(10) Patent No.: US 11,543,688 B2
(45) Date of Patent: Jan. 3, 2023

(54) WAVEGUIDE COMPONENT

(71) Applicant: Karlsruher Institut fuer Technologie, Karlsruhe (DE)

(72) Inventors: Wolfgang Freude, Karlsruhe (DE); Christian Koos, Siegelsbach (DE); Matthias Lauermann, Neuenstein (DE); Sandeep Ummethala, Karlsruhe (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 308 days.

(21) Appl. No.: 16/760,046

(22) PCT Filed: Oct. 24, 2018

(86) PCT No.: PCT/EP2018/000486
§ 371 (c)(1),
(2) Date: Apr. 29, 2020

(87) PCT Pub. No.: WO2019/086138
PCT Pub. Date: May 9, 2019

(65) Prior Publication Data
US 2021/0208429 A1  Jul. 8, 2021

(30) Foreign Application Priority Data
Nov. 2, 2017  (DE) .......................... 102017125581.8

(51) Int. Cl.
*G02F 1/065* (2006.01)
*G02F 1/225* (2006.01)
(Continued)

(52) U.S. Cl.
CPC .............. *G02F 1/065* (2013.01); *G02B 6/12* (2013.01); *G02F 1/225* (2013.01); *G02F 1/3136* (2013.01); *G02B 2006/12142* (2013.01)

(58) Field of Classification Search
None
See application file for complete search history.

(56) References Cited

U.S. PATENT DOCUMENTS 6,785,435 B2 * 8/2004 Ridgway ............... G02F 1/3136
  385/132
8,340,486 B1 * 12/2012 Hochberg ............. G02F 1/0123
  359/332

(Continued)

OTHER PUBLICATIONS

L. Alloatti, D. Korn, R. Palmer, D. Hillerkuss, J. Li, A. Barklund, R. Dinu, J. Wieland, M. Fournier, J. Fedeli, H. Yu, W. Bogaerts, P. Dumon, R. Baets, C. Koos, W. Freude, and J. Leuthold, "42.7 Gbit/s electro-optic modulator in silicon technology," Opt. Express 19, 11841-11851 (2011) (Year: 2011).*

(Continued)

*Primary Examiner* — Rhonda S Peace
(74) *Attorney, Agent, or Firm* — Leydig, Voit & Mayer, Ltd.

(57) ABSTRACT

A waveguide component includes a waveguide, which is at least partially transparent or translucent with respect to light and is set up in such a way that light can be conducted at least partially through the waveguide. The waveguide includes a waveguide core, a first casing region, and a second casing region. The waveguide core is formed from one or more spatially separated elements of at least one waveguide core material. The first casing region, which includes at least one electro-optical material, interacts with light guided in the waveguide. The first casing region is disposed around the one or more elements of the waveguide core. The second casing region includes at least one dielectric material. The second casing region is arranged around the first casing region and/or the waveguide core. The waveguide component further includes at least two line regions that are at least partially electrically conductive.

26 Claims, 8 Drawing Sheets

(51) Int. Cl.
*G02F 1/313* (2006.01)
*G02B 6/12* (2006.01)

(56) References Cited

U.S. PATENT DOCUMENTS

2003/0169958 A1    9/2003  Nippa et al.
2012/0321240 A1*  12/2012  Alloatti .................. G02F 1/025
                                                     385/2
2021/0208429 A1*   7/2021  Freude .................... G02F 1/065

OTHER PUBLICATIONS

Heni et al. "Nonlinearities of organic electro-optic materials in nanoscale slots and implications for the optimum modulator design." Optics Express, vol. 25, No. 3, Feb. 6, 2017, pp. 2627-2653. (Year: 2017).*

Korn, et al. "Silicon-Organic Hybrid (SOH) IQ Modulator for 16QAM at 112 Gbit/s", *Conference on Lasers & Electro-Optics Europe & Internation Quantum Electronics Conference CLEO Europe,*: 1 (May 12, 2013). XP032588408.

Freude, et al. "100 Gbit/s Electro-Optic Modulator and 56 Gbit/s Wavelength Converter for DQPSK Data in Silicon-Organic Hybrid (SOH) Technology," *Photonics Society Summer Topical Meeting Series 2010*: 96-97 (Jul. 19, 2010). XP031736177.

Koos, et al. "Femtojoule Modulation and Frequency Comb Generation in Silicon-Organic Hybrid (SOH) Devices," *16th International Conference on Transparent Optical Networks*: 1-4 (Jul. 6, 2014). XP032627482.

* cited by examiner

1A 100A

1B

100B

Fig. 1-2
1C
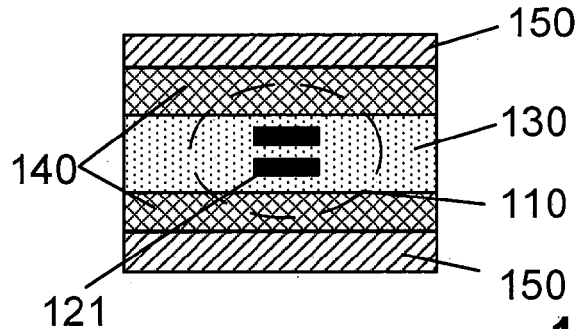
1D
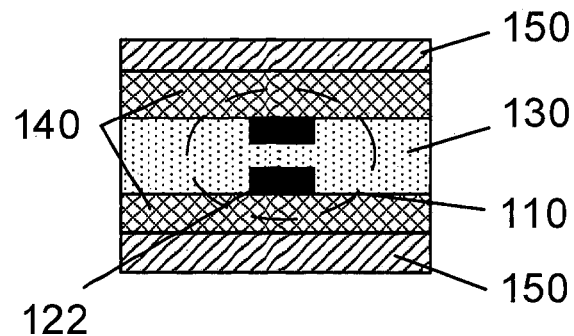
1E
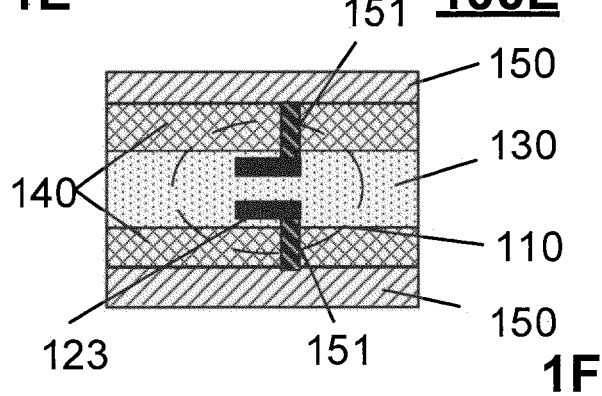
1F
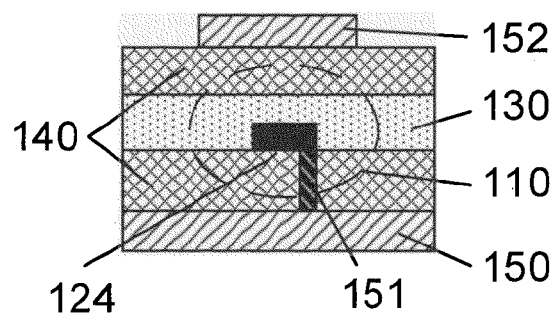

2A 200A

2B 200B

3A 300A 3B 300B

Fig. 4-1
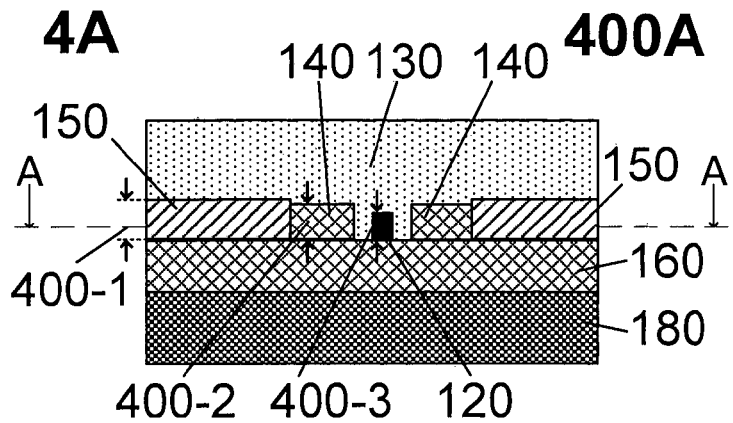
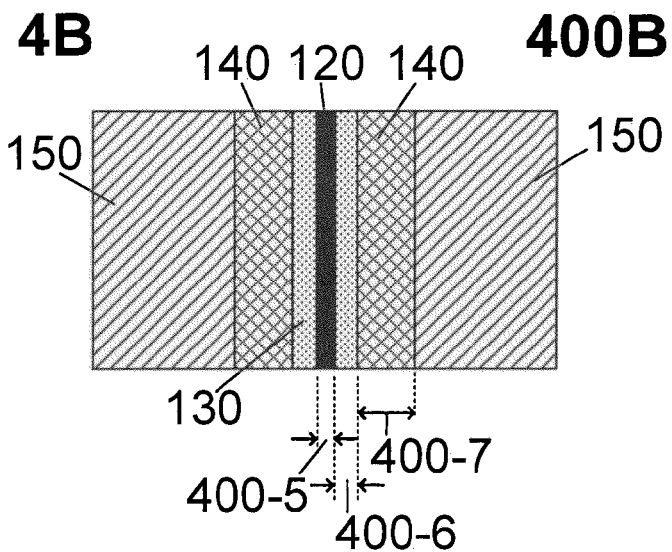
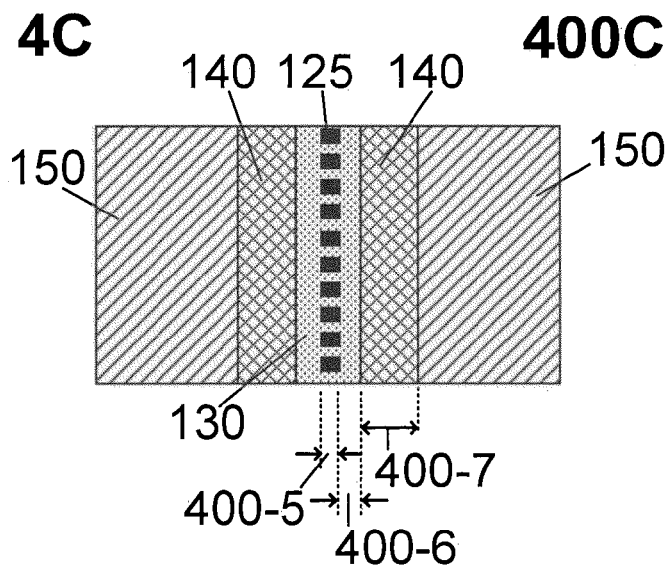

Fig. 4-2
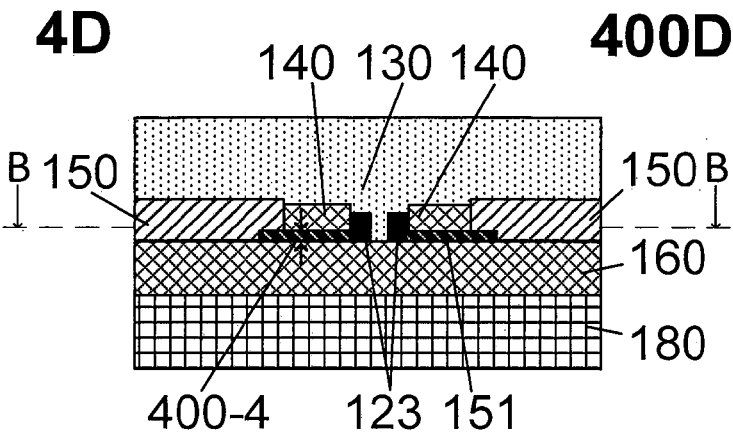
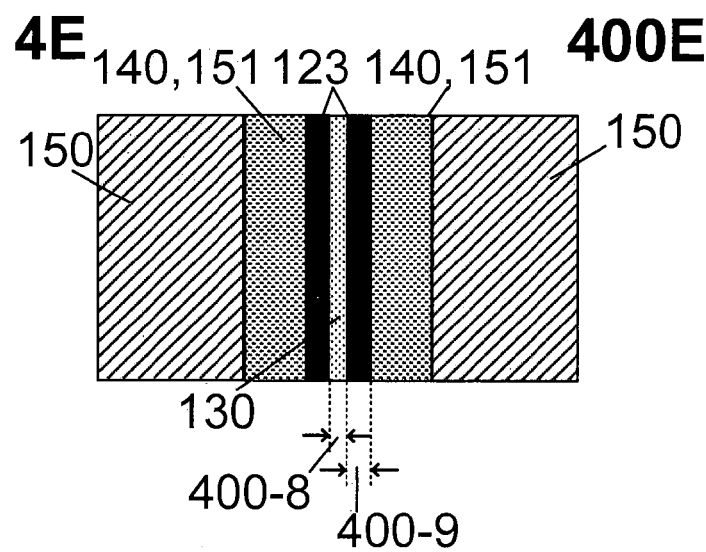
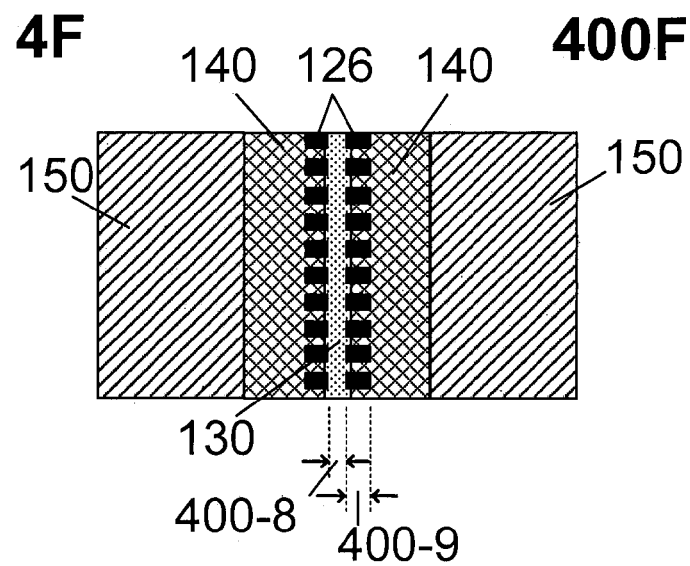

WAVEGUIDE COMPONENT

CROSS REFERENCE TO RELATED APPLICATIONS

This application is a U.S. National Phase Application under 35 U.S.C. § 371 of International Application No. PCT/EP2018/000486, filed on Oct. 24, 2018, and claims benefit to German Patent Application No. DE 10 2017 125 581.8, filed on Nov. 2, 2017. The International Application was published in German on May 9, 2019 as WO 2019/086138 under PCT Article 21(2).

FIELD

The invention relates to a device for conducting light, in particular a waveguide component in the field of integrated optics, in particular waveguide-based electro-optical modulators.

BACKGROUND

Integrated optical circuits are increasingly realized on semiconductor substrates such as, for example, on so-called silicon-on-insulator substrates (SOI), which make it possible to combine a wide variety of functions on one chip. Key components are modulators that can be used to imprint electrical modulation signals or voltages onto a light wave (an "optical carrier"). The term "modulation signal" is to be understood herein as meaning at least one voltage or current signal. Furthermore, the term "waveguide" is to be understood herein as an optical waveguide. Such a waveguide is at least partially transparent or translucent with respect to light and is arranged in such a way that light is at least partially passable through such a waveguide or that light can be guided through such a waveguide. In addition, the term "transparent" is to be understood herein as meaning a material property of the disclosed waveguide and its embodiments, which allows light to pass through the length of the waveguide component with an attenuation of preferably less than 30 dB, particularly preferably less than 20 dB, and very particularly preferably less than 10 dB. Furthermore, the term "light" is to be understood herein as meaning at least one region of the electromagnetic radiation or of the electromagnetic spectrum. In addition, the term "light" herein means electromagnetic waves having vacuum wavelengths of approximately 10 nm to approximately 1 mm, and more particularly between approximately 30 nm and approximately 300 µm (or frequencies between 1 THz and 10 PHz). In other words, the term "light" means at least the following regions of the electromagnetic spectrum, wherein at least the following ranges are included: the ultraviolet region (comprising vacuum wavelengths in the range of about 10 nm to approximately 380 nm or frequencies in a range from approximately 790 THz to approximately 10 PHz), the visible range (comprising vacuum wavelengths in a range from approximately 380 nm to approximately 780 nm and/or frequencies in a range from approximately 380 THz to approximately 790 THz) and the infrared range (comprising vacuum wavelengths in a range from approximately 790 nm to approximately 1 mm and frequencies in a range from approximately 1 THz to approximately 380 THz). Moreover, light herein is to be understood as meaning the light that can be guided within the waveguide component through the waveguide component. Such modulators could be used, for example, in the telecommunications industry, in metrology, or generally in integrated photonics.

Many of the semiconductor-based integrated optical modulators used today make use of the fact that the optical properties (refractive index, absorption) of a semiconductor can be varied with the charge carrier density. At least parts of the optical waveguide must therefore be electrically conductive, which inevitably entails optical losses. A lower electrical conductivity (electric resistance R) reduces the optical losses, but limits the modulation bandwidth in conjunction with an unavoidable modulator capacitance C to a cut-off frequency of the order $1/(RC)$. In many cases, semiconductor-based light modulators are therefore subject to a conflict of objectives between high modulation efficiency, high modulation bandwidth and low optical insertion loss.

As an alternative to the injection of free charge carriers into a semiconductor, light modulators can also be realized with electro-optical materials, which react to an externally applied electric field with a quasi-instantaneous change in the optical properties such as refractive index or attenuation. These materials include, inter alia, those with optical non-linearity of second order, which have the so-called Pockels effect. The Pockels effect can be used to change the refractive index and thus the phase of an optical carrier in proportion to a (quasi-)static electric modulation field.

Silicon is the preferred material for inexpensive integrated optical components. Due to its centro-symmetrical crystal structure, however, silicon has no second-order non-linearity. One possibility for realizing Pockels effect modulators in material systems without second-order non-linearity is hybrid integration with an electro-optical material, for example with organic or polymer-based substances. The light wave is guided in an optical waveguide in such a way that it interacts with the electro-optical material, so that the propagation properties of the optical signal are substantially influenced by the real and/or imaginary part of the complex refractive index in the electro-optical material. The complex refractive index of the electro-optical material can be changed by an externally applied voltage or an externally impressed current. The amplitude and/or the phase of the optical output signal can be adjusted via this external current or voltage signal, optionally in combination with an interferometric structure. To this end, the waveguide must be designed such that the light wave propagates at least partially in the electro-optical material. If the electric field generated by the applied electric voltage is also present in the same spatial region, a quasi-instantaneous change in the optical properties such as the refractive index and thus a change in the material speed of the light wave can be realized by a non-linearity of the second order in the electro-optical material. Efficient modulation is achieved by generating the highest possible electric field strengths for a given carrier power and modulation voltage by selecting a small waveguide cross-section consisting at least partially of electro-optical material.

At the Karlsruhe Institute of Technology (abbreviated to: KIT), so-called silicon-organic hybrid modulators (silicon-organic hybrid, abbreviated to: SOH) were developed and patented (see [1], [3]). Further patents and related publications such as the references [4]-[6] are based on this. The combination of high modulation efficiency (low modulation voltage) at highest bandwidths can, however, only be achieved at the price of high optical losses: The conflict of objectives between modulation efficiency, high modulation bandwidth and low optical insertion loss cannot be resolved in this way.

Structures of this type are disclosed, for example, in the patent application [1] filed by the KIT. In order to achieve a high modulation field strength, a predetermined electrical modulation voltage with optically low-loss ("transparent") electrically conductive line regions ("electrodes") must be brought as close as possible to the electro-optical material filled by the optical field. However, the closer the electrically conductive line regions come to the light-guiding region, the higher the optical losses will be, which leads to the above-described conflict of objectives. To keep the losses low, the doping of the transparent electrodes is limited upwards, which leads to a limitation of the conductivity and thus to speed limitations due to the associated RC time constant. Furthermore, the limited conductivity of the transparent electrodes leads to increased electrical losses in the propagation of the modulation field along the electrode.

The published document [2] discloses an electro-optical component, which has an electro-optically active waveguide core and a casing material consisting of two layers. The first layer of the casing material, which directly adjoins the waveguide core, has a lower electrical refractive index and a lower thickness than the second layer of the casing material, which lies between the first layer and the electrode layers. For a given voltage applied to the electrodes, it is thus possible to increase the electric field strength in the waveguide core, which is used for electro-optical interaction, without impairing the optical waveguide properties of the waveguide by a layer directly adjacent to the waveguide core having a high electrical refractive index and thereby mostly also having a high optical refractive index or high optical absorption.

Documents [7] and [8] describe an electro-optical modulator, in which optimized high-frequency properties are achieved by the use of materials having a high electrical refractive index. In this case, multilayer electrode structures are described, wherein the layer closest to the waveguide core consists of a semiconductor with low doping. These semiconductor layers are electrically connected to the metallic leads outside the influence of the optical field. The resulting lead resistance within the semiconductor layers generally leads to a low-pass behavior. This is overcome by an additional capacitive coupling between the metallic leads and the conductive semiconductor layers. To this end, the metallic leads are flatly extended up to the region of the optical waveguide and capacitively coupled to the conductive semiconductor layers via a dielectric layer of high electrical refractive index. The high electrical refractive index results in a capacitor of high capacitance, which acts as a short circuit at high frequencies and counteracts a drop in the frequency response of the electrode structures.

The structure described in [7] and [8] has a number of disadvantages compared with the structure claimed here. On the one hand, conductive regions close to the optical waveguide are required, since the waveguide core contains so-called multiple-quantum-wells, in which the optical refractive index can only be changed by injection or depletion of free charge carriers. The structure described in [8] does not allow the complete elimination of conductive regions in the vicinity of the optical waveguide. In addition, a cost-effective production of the structures described in [8] in large quantities is difficult to imagine: On the one hand, the structure is based on a complex vertical layer structure, in which the electro-optically active structure consists of a monocrystalline semiconductor which is as defect-free as possible and serves as a basis for the further growth of generally crystalline semiconductor layers. This limits the choice of materials for the electro-optically active layer to materials, which can serve as the basis for the growth of high-quality layers. In the present case, multiple-quantum-wells are used, which have to be grown using complex semiconductor epitaxy methods as monocrystalline semiconductor films having very precisely defined layer thicknesses. It is thus not possible to use highly efficient electro-optical polymers. Furthermore, the structure disclosed in [7] and [8], as described in the independent claim of [8], necessarily requires the removal of the substrate, which makes production extremely difficult. In addition, the structure is based on indium phosphide technology, which is expensive and complex compared with silicon technology (abbreviated to: InP technology).

The document [9] discloses an electro-optical component, which has an electro-optically active material in the casing region of the optical waveguide. The document [9] sets itself apart from structures using electro-optically active materials in the waveguide core and aims to overcome the associated limitations in the choice of materials. The claims of document [9] relate to the embodiment of the optical waveguide, which consists of an inorganic waveguide core and two electro-optically active organic layers enclosing the waveguide core.

Document [10] describes an electro-optical modulator, which has an optical waveguide consisting of an electro-optically active waveguide core and two casing regions. The first casing layer has a low optical refractive index and a low electrical refractive index and the second casing region has a moderate optical refractive index and an increased electrical refractive index. This structure is very similar to [2]. Here, too, the casing material with a high electrical refractive index is used to increase the electric field of an applied voltage in the waveguide core. This considerably limits the choice of electro-optically active materials in accordance with [10]: Since the electro-optical material forms the waveguide core, it should preferably have a high optical refractive index but a small electrical refractive index. Furthermore, [10] and [2] describe a modulator which is based on a vertically layered structure. In accordance with [10], organic materials are used for this purpose, which must be applied to one another in a complex process with high optical quality. Here, it is not possible to achieve a simpler lateral structuring in the production of the modulator.

SUMMARY

In an embodiment, the present invention provides a waveguide component. The waveguide component includes a waveguide, which is at least partially transparent or translucent with respect to light and is set up in such a way that light can be conducted at least partially through the waveguide. The waveguide includes a waveguide core, a first casing region, and a second casing region. The waveguide core is formed from one or more spatially separated elements including or formed from at least one waveguide core material. The first casing region includes or is formed from at least one electro-optical material. The first casing region interacts at least partially with light guided in the waveguide, and wherein the first casing region is disposed at least partially around the one or more elements of the waveguide core. The second casing region includes or is formed from at least one dielectric material. The second casing region is arranged at least partially around the first casing region and/or the waveguide core. The waveguide component further includes at least two line regions that are at least partially electrically conductive. The line regions are configured to have an electrical modulation signal applied there between. The line regions are arranged at least partially along the optical waveguide in such a way that the line regions are opposite one another and the waveguide is arranged at least partially between the line regions. The modulation signal forms an electric field having field lines, which at least partially penetrate both the second casing region and the first casing region. The dielectric material of the second casing region has a higher electrical refractive index in the frequency range of the modulation signal than the electro-optical material of the first casing region.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1-2 shows, in subfigures 1C to 1F, four schematic cross-sectional views of further embodiments 100C to 100F of devices;

FIG. 2-1 shows, in subfigures 2A and 2B, two schematic cross-sectional views of further embodiments 200A and 200B of devices;

FIG. 2-2 shows, in subfigures 2C to 2E, three schematic cross-sectional views of further embodiments 200C to 200E of devices;

FIG. 3-1 shows, in subfigures 3A and 3B, two schematic cross-sectional views of further embodiments 300A and 300B of devices;

FIG. 3-2 shows, in subfigures 3C and 3D, two schematic field diagrams 300C and 300D in accordance with embodiments 300A and 300B in subfigures 3A and 3B;

FIG. 4-1 shows, in subfigures 4A to 4C, three schematic cross-sectional views of further embodiments 400A to 400C of devices; and FIG. 4-2 shows, in subfigures 4D to 4F, three schematic cross-sectional views of further embodiments 400D to 400F of devices.

DETAILED DESCRIPTION

Figure 1:
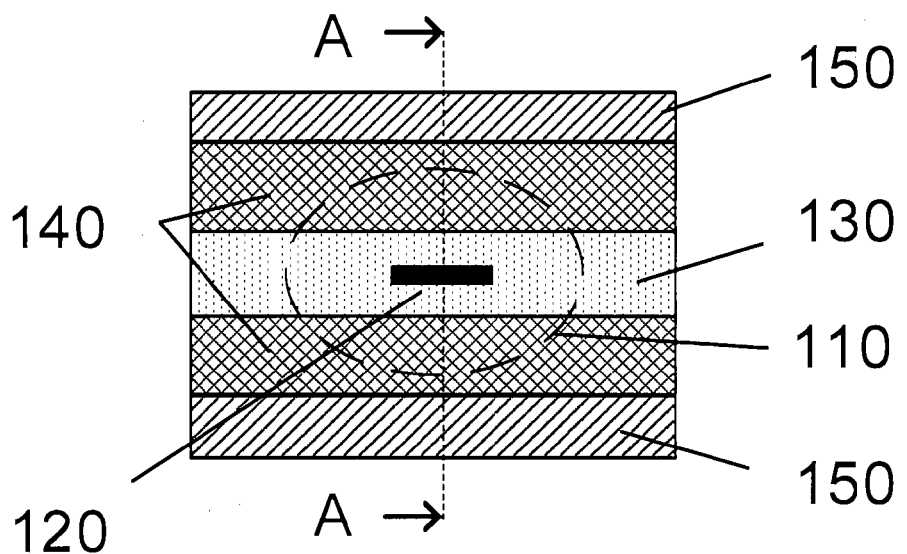
FIG. 1-1 shows, in subfigure 1A, a schematic cross-sectional view of a first embodiment 100A of a device, and in subfigure 1B, a schematic diagram 100B with respect to refractive index and normal component in accordance with FIG. 1A.
Figure 1:
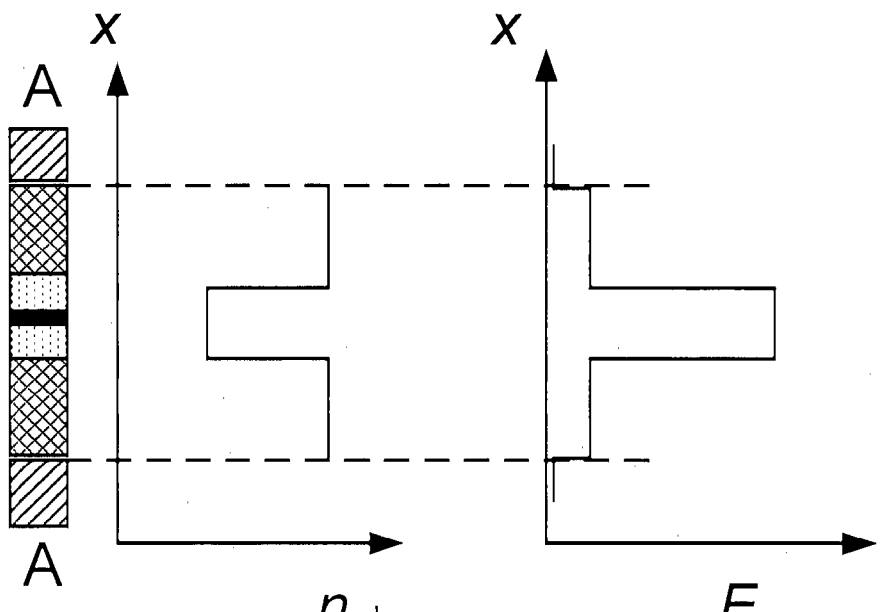

The present disclosure describes integrated optical modulators designed or formed by employing a material selection and an operating principle in such a way that electrically conductive regions with a high concentration of free charge carriers in the interaction region of the light guided in the waveguide can be avoided or their influence can be greatly reduced, while still meeting the requirements for high modulation efficiency, high modulation bandwidth and low optical insertion loss. The interaction range of the light guided in the waveguide is considered here to be the range, in which the intensity is weaker by less than a factor of 1000 than the highest intensity value occurring in the waveguide cross-section. It should also be possible to produce the underlying structure in large quantities using the simplest possible manufacturing process, ideally using highly scalable manufacturing processes from silicon-based microelectronics (for example so-called "Complementary Metal Oxide Semiconductor", CMOS). Furthermore, the structure should retain advantages of the concept claimed in [1]. These advantages include, for example, the use of an electro-optical material in the waveguide casing instead of in the waveguide core. This makes it possible, for example, to use easily structurable semiconductor materials with a high refractive index (such as silicon) for the waveguide core, even if they have no electro-optical activity. The high-index waveguide core material enables a strong concentration of light and thus small component dimensions can then be combined with a suitable multiplicity of electro-optical casing materials, wherein the interaction of the light guided in the waveguide can be achieved by a special design of the waveguide core, for example in the form of a slot waveguide. Especially advantageous in this context are arrangements, in which the electro-optically active material does not have to serve as a basis for further deposition of layers with high electrical or optical quality and possibly a crystalline crystal structure. Such arrangements make it possible, in particular, to use organic electro-optical materials as active material, which have extremely high electro-optical coefficients, but are suitable only to a limited extent or not as a basis for further inorganic layers. These materials make it possible, inter alia, to modulate the refractive index and thus the optical phase simply by applying an electric field, without a current having to be impressed into the active region. Such configurations can be achieved, for example, by a lateral structuring of optical waveguides, electrically conductive conductor tracks and interposed dielectric regions, onto which the electro-optically active material can be deposited after completion of the structuring with comparatively low requirements with regard to layer thickness, layer quality and lateral dimensions. In order to produce the waveguide structures, it is desirable to largely resort to commercially available, readily controllable and highly scalable silicon-based production processes from microelectronics ("silicon photonics") which, in contrast to production on III-V semiconductors such as indium phosphide, enable markedly improved scalability to high quantities and to complex photonic circuits. An important requirement is also that the modulator structures can be combined as seamlessly as possible in a monolithic integration approach with other components from the now very extensive portfolio of Si-photonics. Furthermore, it is desirable to dispense with complex manufacturing processes, including, for example, the removal of the semiconductor substrate.

The structure described by [2] differs in several respects from the structure described in the present disclosure. On the one hand, in the structure described by [2] the electro-optical activity is only present in the waveguide core of the waveguide, but not in the casing. The objective of the structure claimed by Suzuki is therefore to maximize the electric field generated in the waveguide core by an externally applied voltage and to minimize it accordingly outside the core. The solution in accordance with [2] differs fundamentally from the solution described herein, namely to maximize the field in a particular region outside the core and to minimize it accordingly in the waveguide core. The fact that the structure described by [2] has electro-optical activity only in the waveguide core of the waveguide also greatly limits the choice of materials for the electro-optical active zone, since these must have a high refractive index in addition to a high electro-optical coefficient to ensure good wave guidance. These requirements are met only by a limited number of materials and in many cases are additionally accompanied by a high electrical refractive index, which in turn reduces the electrical field strength of the modulation field effective in the waveguide core. This conflict of objectives is completely avoided in the structure of the present disclosure, since the objective is to achieve a high electric field strength in casing material that has a low electric and optical refractive index. Furthermore, the structure disclosed in [2] is based on a layered arrangement of structures, in which the electro-optically active layer serves as the basis for further deposition of casing and electrode layers of high electrical or optical quality. This further restricts the choice of materials—Suzuki explicitly mentions in its patent document that non-linear optical crystals such as lithium niobate are preferably used for the electro-optical waveguide core, which must first be brought to the thickness of the waveguide core by polishing processes. This leads to complex manufacturing processes with high precision requirements, which should be unsuitable for cost-effective mass production. Processing with commercially available, readily controllable and highly scalable silicon photonic production processes thus appears to be difficult to imagine, as can the monolithic co-integration with further components or the production of the modulators via a lateral structuring of optical waveguides, electrically conductive conductor tracks and interposed dielectric regions, onto which the electro-optically active material can be deposited with comparatively low requirements with regard to layer thickness, layer quality and lateral dimensions.

In contrast to the structure described in [8], the present disclosure makes it possible to completely avoid conductive regions near the waveguide or to greatly reduce their influence. Furthermore, the present disclosure makes it possible to use a wide variety of electro-optical materials, for which no special requirements regarding processability have to be met. This makes it possible to use a material with optical properties that can already be varied by an applied electric field, so that no charge carrier transport is necessary. In order to achieve a high efficiency of the component, a field overshoot at the interface of a dielectric material with a high electrical refractive index is utilized in a targeted manner; see below in the solution section. The present disclosure further enables component structures, in which first a lateral structuring of optical waveguides, electrically conductive conductor tracks and interposed dielectric regions is carried out, onto which the electro-optically active material can be deposited after completion of the structuring with comparatively low requirements with regard to layer thickness, layer quality and lateral dimensions. Furthermore, in contrast to the patent of Dagli et al., the present disclosure does not require the removal of the substrate. Conventional production lines for the silicon-based microelectronics or the silicon photonics can be used for production.

This structure described by [9] differs in several respects from the arrangement described in the present disclosure: On the one hand, to produce the structure described by [9], it is necessary to use the electro-optically active layer as the basis for a further deposition of electrode layers. This severely limits the choice of materials. Moreover, the configuration described in [9] does not allow a lateral structuring of optical waveguides, electrically conductive conductor tracks and interposed dielectric regions to be carried out first, and only then, in a subsequent deposition step, to apply the electro-optically active material with comparatively low requirements with regard to layer thickness, layer quality and lateral dimensions. Processing with commercially available, easily controllable and highly scalable silicon photonic manufacturing processes is not possible on the basis of the document [9], nor is monolithic co-integration with other silicon components. Moreover, in accordance with [9], the possibility of increasing the modulation field strength generated by an applied voltage in the electro-optically active casing region by using a first and second casing region with different electrical refractive indices, which possibility the present invention is based upon, is not addressed.

The disclosure provides for solving the conflict of objectives between high modulation bandwidth, high efficiency and the associated low operating voltage, and low optical losses. This is mainly achieved by introducing a dielectric material between the electrically conductive line regions and the electro-optically active waveguide. The dielectric material has a high electrical refractive index in the range of the modulation frequencies, which are typically 1-100 GHz, but a small optical refractive index in the range of the optical frequencies, which are typically in the range of 200 THz. The modulation field is amplified by the ideally transparent dielectric material without affecting the light guidance.

Silicon-based photonic circuits enable very small, highly integrated transmitter modules which are required in optical communication. Particularly energy-saving and extremely fast modulators, as disclosed herein, could open up a new market. Previous conventional silicon modulators only allow data rates up to about 50 Gbit/s and require drive voltages of several volts. The present disclosure describes capacitively coupled silicon-organic hybrid (SOH) modulators that enable a reduction in the drive voltage by up to a factor of 10, a simplified processing and an increase in the modulation bandwidth and thus the possible data rate. The next generation of optical data connections requires a higher bandwidth with lower power consumption than is possible today. These can be used, for example, to cover the demand for optical interconnects in data centers and for high-performance computers, but also in optical metro networks.

The refractive index, also the refractive index or optical density, is an optical material property. This dimensionless physical variable indicates the factor, by which the wavelength and the phase velocity of light are smaller than in the vacuum. Herein, in accordance with the last paragraph, the terms "refractive index", "refraction index" and "optical density" are used synonymously. The terms "conduct" and "guide" are also used synonymously herein, i.e. with respect to a waveguide device according to the disclosure, which is set up in such a way that light can be conducted or guided through a waveguide device.

To distinguish the refractive indices of a material in different frequency ranges, in the following the "optical refractive index" is used for the refractive index in the frequency range of the light wave and the "electrical refractive index" for the refractive index in the frequency range of the electrical modulation signal.

Light is refracted and reflected at the interface of two media of different refractive indices. The medium with the higher refractive index is called the optically denser one. This is not to be confused with the "optical density" as a measure of extinction.

The term "refractive index" comes from the term refraction and its occurrence in Snell's law of refraction. The refractive index n is a dimensionless physical variable. It indicates the ratio of the vacuum light velocity $c_0$ to the propagation velocity $c_M$ of the light in the medium in accordance with the following formula 1:

$$n = c_0/c_M \quad (1)$$

A first embodiment (cf. FIG. 1-1, subfigure 1A and the corresponding detailed description below) comprises a one-piece waveguide core formed by means of at least one strip waveguide having a high optical refractive index. The optical refractive index of the core at the operating wavelength is preferably more than 1.8, particularly preferably more than 2.5, and very particularly preferably more than 3.0. The waveguide core itself need not have electro-optical activity; accordingly, a variety of materials may be considered for its manufacture, such as semiconductors such as silicon or compound semiconductors, dielectrics such as metal oxides or nitrides having a high refractive index, or else organic materials having a correspondingly high refractive index. The waveguide core is surrounded, at least in regions or partially in the interaction region of the light guided in the waveguide, by a first casing region, which at least partially consists of an electro-optical active material. In addition, a second casing region is arranged in the region of the waveguide core between the electro-optical material of the first casing region and the electrically conductive line regions. The second casing region is made of a dielectric material, which does not necessarily require electro-optical properties. Critical for the functionality is the fact that the dielectric material of the second casing region in the (electrical) frequency range of the applied modulation voltage has a high electrical refractive index no, which is the same as the electrical refractive index of the first casing region. This leads to an increase in the electrical modulation field in the region of the optical waveguide with a low electrical refractive index and thus in the electro-optically active casing region, which in turn leads to an increased modulation efficiency of the component, see below. The electric refractive index of the second casing region is preferably greater than 4.5, particularly preferably greater than 8, and most preferably greater than 12, while the electric refractive index of the first casing region is preferably less than 4.5, particularly preferably less than 3.5, and most preferably less than 2.9. The ratio between the electrical refractive indices of the first and second casing regions is preferably in the range of 2, more preferably in the range of 3, and most preferably in the range of 4. The electrical refractive index of the waveguide core should be selected as high as possible. It should be noted that precisely this fact distinguishes the structure according to the present disclosure from the structure disclosed in [2]. There, the electro-optical activity is in the waveguide core of the waveguide, and it is desirable to use a material with as small an electrical refractive index as possible in order to maximize the field strength in the waveguide core. This objective is often in conflict with the requirement that the waveguide core must have an optical refractive index that is the same as the first casing region in order to enable an optical light guide at all. This contradiction can be resolved with the present claimed configuration, since the requirement for a waveguide core material with a high refractive index both in the electrical and in the optical frequency range is much simpler and can be met by a substantially larger variety of materials. The optical refractive index of the waveguide core material is preferably above 2.1, particularly preferably above 2.8, and most preferably above 3.3. The optical refractive indices must be selected such that the first casing region has a smaller optical refractive index than the waveguide core. The optical refractive index of the second casing region can be selected to be smaller than the optical refractive index of the core, but does not have to be selected such. In the latter case, the thickness of the first casing region must be selected so large as to ensure that optical power is not radiated into the second casing region. To explain the operation of the first embodiment, the continuity condition for the normal component $D_n = \varepsilon_0 \varepsilon_r E_n$ of the dielectric displacement density Dn of the modulation field in the transition from a first region with relative dielectric constant $\varepsilon_{r,1}$ at the interface to a second region with relative dielectric constant $\varepsilon_{r,2}$ must be noted. Refractive index n and relative dielectric constant $\varepsilon_r$ are linked by non-magnetic materials $n^2 = \varepsilon_r$, in accordance with the following formulae 2 and 3:

$$D_n = n_{e1,1}^2 E_{n,1} = n_{e1,2}^2 E_{n,2} = \text{const.} \tag{2}$$

and $$E_{n,1}/E_{n,2} = n_{e1,2}^2 / n_{e1,1}^2 \tag{3}$$

In the case of small electrical refractive indices no in the first casing region and high electrical refractive indices $n_{e1} \gg n_{e1}$ in the second casing region, the modulation field strength $E_n$ in the electro-optically active first casing region is significantly larger than the field strength $E_n$ in the second casing region. FIG. 1-1 in sub-figure 1B, described in detail below, schematically shows the course of the electrical refractive index and the course of the electrical modulation field at the center of the waveguide cross-section. A modulation voltage applied across the electrically conductive line regions decreases substantially above the first casing region if the waveguide geometry and the electrical indices of refraction of the casing and waveguide core materials are suitably selected. The material of the waveguide core preferably has an electrical refractive index greater or equal to the electrical refractive index of the first casing region.

For the first embodiment, with a given modulation voltage, the electrical modulation field is thus concentrated on the first casing region with low electrical refractive index, which leads to an increased interaction of the modulation field with the light wave in the nonlinear electro-optical casing material if, according to the present disclosure, a dielectric casing material is used in the second casing region with an electrical refractive index higher than that of the electro-optical material in the first casing region. Materials with a high electrical refractive index in the frequency range of up to several hundred gigahertz include oxides, especially oxides of transition metals (e.g. $ZrO_2$, $HfO_2$, $La_2O_3$, $Ta_2O_5$, $Y_2O_3$, $TiO_2$, . . . ), titanates (e.g. $BaTiO_3$, $SrTiO_3$, $BaSrTiO_3$, . . . ), silicates (e.g. $HfSiO_4$, $ZrSiO_4$, . . . ), or combinations thereof. However, other dielectric materials may also be used, e.g. based on organic compounds. Optionally, in the claimed structure, materials with electro-optical effects can also be used in the waveguide core, which amplify the electro-optical interactions originating from the first casing region.

In a further embodiment (cf. FIG. 1-2, subfigure 1C and the corresponding detailed description below) of the structure according to the present disclosure, the waveguide core consists of two parts separated by a slot (optical slot waveguide). The slot is filled with the electro-optical material belonging to the first casing region, which has an optical refractive index less than that of the two-part core (slot waveguide). The difference in the optical refractive indices of the core and the first casing region is preferably greater than or equal to 0.5, particularly preferably greater than or equal to 1, and very particularly preferably greater than or equal to 1.5. In this geometry, the discontinuous field overshoot of the normal component of the electric light field $E_n$ at the side walls of the slot and at the boundary surfaces of the core oriented toward the electrically conductive line regions is utilized in order to concentrate a fixed part of the electrical field of the optical wave in the slot and thus in the material of the first casing region, so that continuity equations 4 and 5 are also fulfilled in this embodiment which are:

$$D_n = n_{opt,1}^2 E_{n,1} = n_{opt,2}^2 E_{n,2} = \text{const.} \quad (4),$$

and $$E_{n,1}/E_{n,2} = n_{opt,2}^2 / n_{opt,1}^2 \quad (5).$$

The normal component of the electric field strength $E_n$ of the optical field becomes particularly large if a dominantly perpendicular to the interface, in this case vertically polarized optical field, is selected. The field interaction factor $\Gamma$ is usually used as a measure for the interaction of the light guided in the waveguide with the casing material, as described here under the assumption that the optical field is polarized in the x-direction (cf. e.g. vertical polarization in FIG. 1-2, subfigure 1C), wherein the field interaction factor $\Gamma$ is defined by equation 6, which is:

$$\Gamma = \frac{n_{opt}}{Z_0} \frac{\int_A |E_x|^2 dA}{2P(\omega_c)}. \quad (6)$$

The field interaction factor $\Gamma$ describes the proportion of the optical field, which interacts with the modulation field in the electro-optical casing material, assuming that the corresponding tensor element of the nonlinear susceptibility is not zero. $E_x$ is the x component of the optical field, P is the power of the optical field, $n_{opt}$ is the refractive index of the electro-optical material, $Z_0$ is the wave impedance in the vacuum and A is the cross-sectional region, in which the optical field interacts with the modulation field in the electro-optical material.

This structure also allows the electrical modulation field in the first casing region directly surrounding the two-part waveguide core to be increased by arranging a second casing region of dielectric material with a high electrical refractive index in the region of the waveguide core between the electrically conductive line regions and the electro-optical material of the first casing region. The combination of optical and electrical field overshoot leads to a particularly strong interaction of the electrical and the optical field in the electro-optical material in the slot.

Another embodiment (cf. FIG. 1-2, subfigure 1D and the corresponding detailed description below) of the structure, for example, connects the dielectric material with high electric refractive index of the second casing region directly to the two-part waveguide core of an optical slot waveguide. Here, too, the optical and electrical field overshoot at the interfaces between regions with a high and low refractive index leads to a strong interaction of the fields with the electro-optical material in the slot belonging to the first casing region.

In a further embodiment (cf. FIG. 1-2, subfigure 1E and the corresponding detailed description below) of a structure, optically transparent line regions connect the individual parts of a multipart waveguide core to electrically conductive line regions. The electro-optical material of the first casing region fills the slot between the parts of the waveguide core. The second casing region of dielectric material having a high electrical refractive index is arranged between the electrically conductive line regions and the first casing region. Analogously to the embodiment described above, the second casing region may also directly adjoin the waveguide core. When the conductivity of the transparent line regions is moderate, this structure achieves a high field strength for low frequencies of the electrical modulation field in the slot (low-pass characteristic). An optimal frequency response can be achieved in combination with the field overshoot of the electric field by the material having a high electric refractive index in the second casing region, which is also effective for very high frequencies. Furthermore, these transparent line regions can also be used with low conductivity if a poling process of the electro-optical material is required during fabrication. The poling of electro-optical materials is the alignment of molecules or domains of an electro-optical material so that a macroscopic electro-optical effect is formed in the poled material volume. This can be achieved in electro-optical materials with molecules that have, for example, a dipole moment, inter alia, in that a strong electric field is generated via a direct voltage, and the molecules align themselves with the field lines of this field. A direct voltage can be applied via the transparent line regions during the poling process, so that a strong electric field is formed in the slot, thus enabling poling.

Since only very low conductivities are required for a direct voltage, a structure for poling can also be achieved, for example, with components from the previously described embodiments. In this case, the waveguide core is slightly conductive, which can be achieved, for example, in silicon by slight doping. Outside the modulator structure, a part of the waveguide core is electrically connected to a specific poling electrode, see FIG. 3-1, subfigure 3B and its description below. A direct voltage can now be applied via these poling electrodes and the low-conductivity parts of the waveguide core during fabrication so that the electro-optical material in the slot can be poled.

In a further embodiment (cf. FIG. 1-2, subfigure 1F and the corresponding detailed description below) of a structure, a transparent line region connects a part of the waveguide core to an electrically conductive line region. The first casing region is made of electro-optical material. Dielectric material with high electrical refractive index is placed in the second casing region between the electro-optical material and the electrically conductive line regions, so that the electrical modulation field in the electro-optical material of the first casing region is increased at a given applied modulation voltage. Here, the effect is equivalent to the structure depicted in subfigure 1E.

The concept of single—or multipart waveguide cores in combination with a casing of partially nonlinear electro-optical, partially linear materials having a high electrical refractive index can be generalized to further structures. For a high modulation efficiency, the most possible interaction of the optical field with the electrical modulation field is required. This interaction in the electro-optical material is increased by an elevation of the optical field and the electrical modulation field. To this end, as described in the above sections, the continuity condition for the normal component of the dielectric displacement density $D_n$ at dielectric interfaces is utilized.

In addition to the embodiment of the waveguide core as a strip or slot waveguide, it can also be formed by periodic or non-periodic structures with structural details much smaller than the optical wavelength, for example with a waveguide core consisting of blocks of materials of high refractive index arranged in an unconnected manner along the direction of propagation of light (so-called "sub-wavelength grating waveguides"). These structures can be embodied both as strip waveguides and as slot waveguides and enable a stronger interaction of the optical wave with the electro-optical casing material. Furthermore, the waveguide core or surrounding regions along the propagation direction can be structured such that the propagation properties of the optical mode are advantageously influenced. These include, for example, so-called "slow light structures" which reduce the group velocity of the guided light and thus increase the interaction time of the optical field with the electro-optical material. This leads to a high electro-optical interaction on a short path. Slow light structures can be realized, for example, by photonic crystals. Structures can also be realized, which adapt the group velocity of the optical field to that of the electrical modulation wave.

Figure 2:
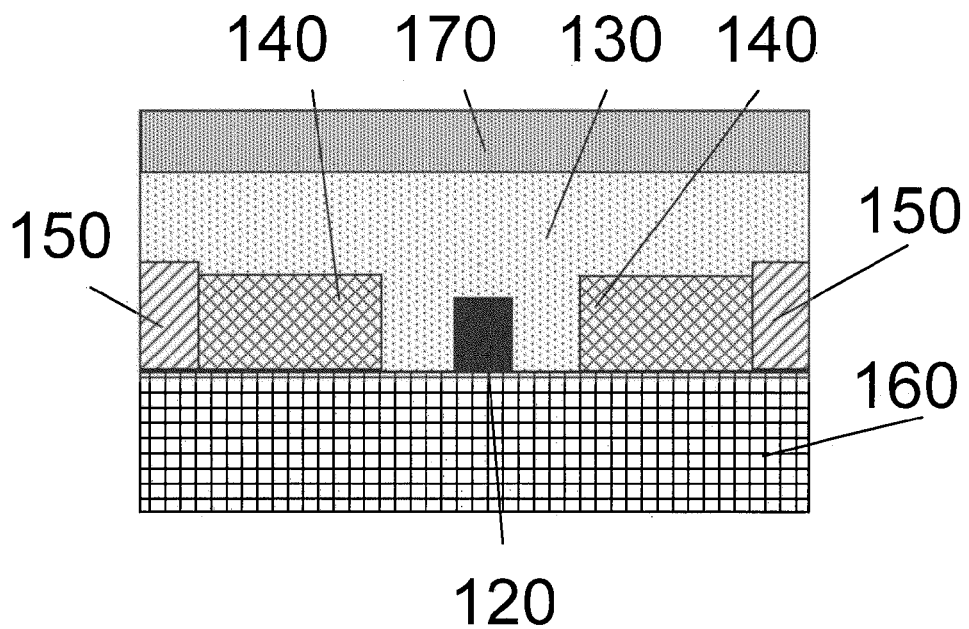
Figure 1:
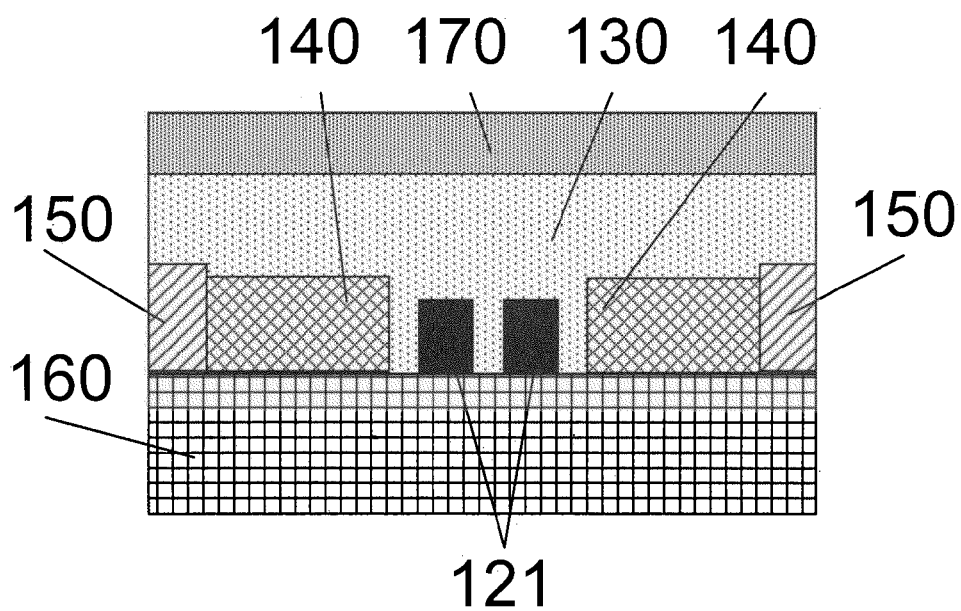
Figure 2:
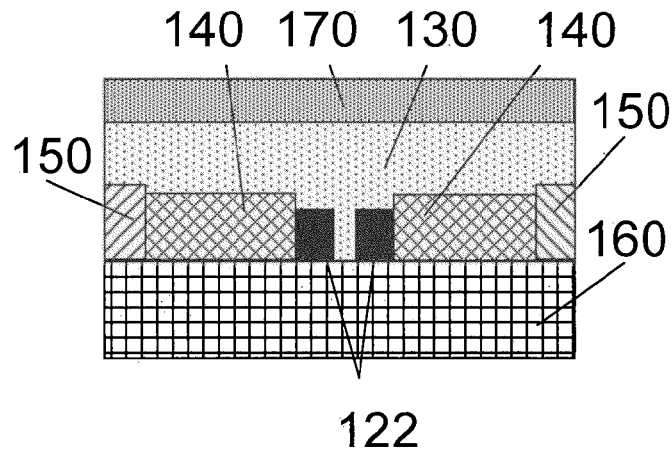
Figure 2:
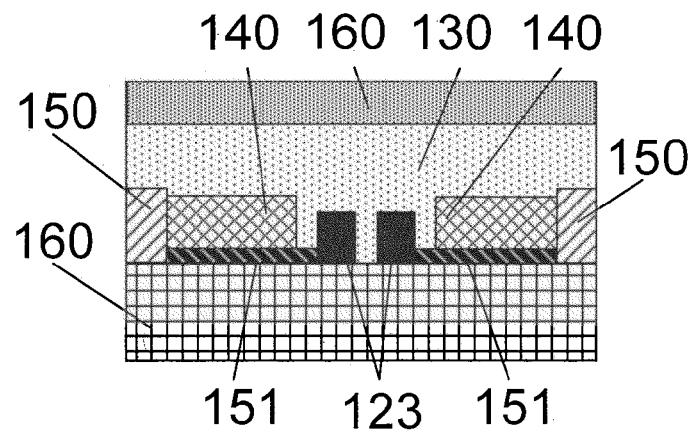
Figure 2:
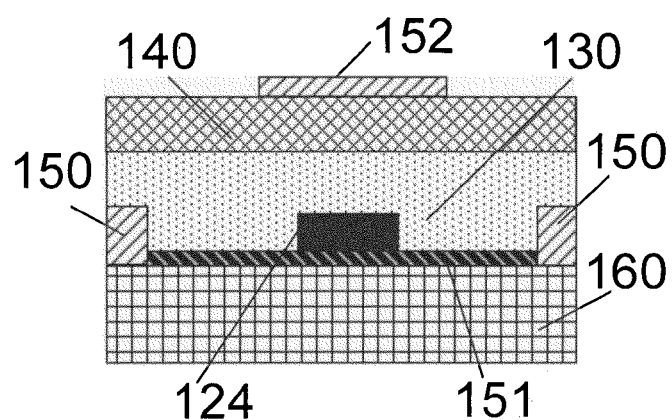

As explained above, it is advantageous to resort to commercially available and scalable manufacturing processes for the production of electro-optical modulators. To this end, it is particularly advantageous to use lateral structuring instead of vertical structuring of the component, whereby first the optical waveguide core, the electrically conductive line regions and the dielectric structures belonging to the second casing region are produced in a planar arrangement, onto which the electro-optically active material can then be applied with comparatively low requirements with regard to layer thickness, layer quality and lateral dimensions. FIG. 2-1 and FIG. 2-2 show such lateral arrangements of structures analogous to the general component concept illustrated in FIG. 1-1 and FIG. 1-2. An optically transparent material acts as the substrate and simultaneously as the lower waveguide casing. For example, this can be an oxide such as $SiO_2$, $Al_2O_3$, . . . . During production, first the waveguide core or its components, the second casing region made of dielectric material with a high electrical refractive index, the transparent line regions, and the electrically conductive line regions can be placed next to one another on the substrate by conventional lateral structuring processes, before the first casing region made of at least partially electro-optical material and, if necessary, further cover layers are applied. In these arrangements, it is in particular not necessary to deposit further layers with high electrical or optical quality and possibly a crystalline crystal structure on the electro-optical material of the first casing region. This drastically simplifies production and expands the range of electro-optical materials that can be used. This makes it possible, in particular, to introduce, for example, organic materials of the first casing region from the liquid phase into the prestructured component. It is not necessary to remove the substrate for these structures.

In a first embodiment, a waveguide comprises the following components: a waveguide, which is at least partially transparent or translucent to light and which is arranged in such a way that light can at least partially pass through the waveguide, or can be guided through the waveguide, comprising: a waveguide core, wherein the waveguide core is formed from one element or from a plurality of elements spatially separated from one another, which comprise or are formed from at least one waveguide core material; a first casing region, which comprises or is formed from at least one electro-optical material, wherein the first casing region interacts at least partially with light guided in the waveguide, and wherein the first casing region is arranged at least partially around the one element or the plurality of elements of the waveguide core; and a second casing region comprising or formed from at least one dielectric material, wherein the second casing region is arranged at least partially around the first casing region and/or the waveguide core; at least two line regions, which are at least partially electrically conductive, wherein an electrical modulation signal is applied between the line regions, wherein the line regions are arranged at least partially along the optical waveguide such that the line regions are opposite each other and the waveguide is arranged at least partially between the line regions; characterized in that the modulation signal forms an electric field with field lines at least partially penetrating both the second casing region and the first casing region, and wherein the dielectric material of the second casing region has a higher electric refractive index in the frequency range of the modulation signal than the electro-optical material of the first casing region.

It is noted that the feature: "and wherein the first casing region is at least partially arranged around the one or more elements of the waveguide core" is to be understood herein as meaning that the first casing region is arranged around the one or more elements of the waveguide core in such a way that the casing region and the element or elements are at least partially in direct or indirect contact with each other. In other words, it is meant herein that either the first casing region and the element or elements of the waveguide core are at least partially directly adjacent to one another or that additional elements or materials can be arranged at least partially between the first casing region and the element or elements of the waveguide core.

In a further embodiment, the electrical refractive index of the dielectric material in the second casing region at a frequency of the modulation signal of 10 GHz is more than a factor of 1.8 above the electrical refractive index of the electro-optical material in the first casing region. The difference in the electrical refractive index results in a field overshoot and the electric field of the modulation signal concentrates on the first casing region with a low electrical refractive index, which leads to an increased interaction of the modulation field with the light wave in the nonlinear electro-optical casing material and thus to an increased efficiency of the component.

In a further embodiment, the dielectric material of the second casing region has an electrical refractive index of at least 3.5, 4.5, 8, 10, 15, 20 or 25 in a frequency range of a modulation signal between 5 GHz and 40 GHz, or in particular with a relative dielectric constant $\varepsilon_r$ in a range from approximately 80 to approximately 250. The higher the electrical refractive index in the second casing material, the greater the field overshoot in the electro-optical material if its refractive index is kept constant. This in turn leads to an increased efficiency of the component.

In a further embodiment, the electrical refractive index of the waveguide core is higher than the electrical refractive index of the first casing region. This results in an increase in the field of the modulation field not only at the interface between the first and second casing regions, but also at the interface between the first casing region and the waveguide core. As a result, a further increase of the field strength in the electro-optical material of the first casing region is achieved, which increases the efficiency of the component.

In a further embodiment, the electrical refractive index of the waveguide core is at least 3. Since the electrical refractive index of electro-optical materials is often less than 3, it is desirable to use a waveguide core having an electrical refractive index of at least 3 or more in order to utilize a stronger field overshoot of the modulation field in the first casing region.

In a further embodiment, the electrical refractive index of the electro-optical material in the first casing region (130) is at most 9. The lower the electrical refractive index of the first casing region can be selected, the greater the field overshoot of the modulation field in the first casing region in accordance with equation 2. This increases the efficiency of the component. Furthermore, the restriction to materials with an electrical refractive index lower than 9 in the first casing region allows a larger number of materials to be used for the second casing region, which fulfill the condition that the electrical refractive index is higher than in the first casing region.

In a further embodiment, the waveguide component has a lateral structuring, in which initially the waveguide core, the line regions and at least the dielectric material of the second casing region are formed in a planar arrangement, onto which electro-optically active material is then applied. This considerably simplifies production, in particular, organic materials of the first casing region can be introduced from the liquid phase into the prestructured component, for example, and at the same time extends the spectrum of electro-optical materials that can be used, in particular because the electro-optically active layer does not have to serve as the basis for further deposition of casing and electrode layers of high electrical or optical quality.

In a further embodiment, the waveguide core, the first casing region, the second casing region and the line regions are arranged at least partially next to one another on a common substrate. This arrangement significantly simplifies the fabrication, since existing industrial technologies and manufacturing processes such as, for example, the "silicon-on-insulator" platform can be used. Furthermore, it is thereby not necessary to deposit further layers of high electrical or optical quality on the electro-optical material of the first casing region, which further simplifies production.

In a further embodiment, the waveguide core has at least partially electro-optical properties (abbreviated to: EO properties). A waveguide core, which is at least partially electro-optically active, increases the efficiency of the modulator by allowing the electrical modulation signal and the light wave in an electro-optically active material to interact with each other not only in the first casing region, but additionally also in the waveguide core.

In another embodiment, the waveguide core is formed as a slot waveguide. The embodiment of the core as a slot waveguide leads to a field overshoot of the electric field of the light wave in the first casing region within the slot. Since the electric field of the modulation signal in the first casing region is also increased, this arrangement leads to a further increase in the modulation efficiency.

In a further embodiment, the difference between the optical refractive index of the waveguide core material of the slot waveguide and the optical refractive index of the first casing material is more than 0.5 or more than 1.0 or more than 1.5. The greater the difference between the highly refractive waveguide core material of the slot waveguide and the first casing material with the lower optical refractive index, the stronger is the field overshoot of the electric field of the light wave in the electro-optically active first casing region. This makes it possible to realize particularly efficient components.

In a further embodiment, the second casing region at least partially adjoins the electrically conductive line regions. In other words, the second casing region is at least partially in direct contact with the electrical regions. The fact that the second casing region, which has a high electrical refractive index, is directly connected to the line region, prevents part of the electrical modulation signal from filling the region between the line region and the second casing region, which is not filled by the field of the light wave and therefore cannot contribute to modulation. This avoids a reduction in modulation efficiency.

In a further embodiment, the second casing region at least partially adjoins the first casing region. In other words, the second casing region is at least partially in direct contact with the first casing region. Since the first casing region is at least partially electro-optically active, it is desirable that the electric field of the modulation signal is mainly concentrated in this region. The avoidance of a further region between the first and second casing region allows the field overshoot caused by the difference in the electrical refractive index to be exploited in an optimal way.

In a further embodiment, the second casing region at least partially adjoins the waveguide core. In other words, the second casing region is in direct contact with the waveguide core or its elements. In particular, if a slot waveguide is used, the electric field strength of the modulation signal within the slot can thereby be maximized. The field strength of the light wave is also typically highest in the slot, which is filled by the electro-optically active material of the first casing region. The concentration of the field of the light wave and that of the modulation signal in the slot lead to a high interaction in the electro-optically active material and thus to a high efficiency of the component.

In a further embodiment, the waveguide core is at least partially electrically conductively connected to the line region via a further, moderately conductive and transparent line region. This structure can be used to achieve a high field strength for low frequencies of the electrical modulation field in the slot, particularly for slot waveguides. An optimum frequency response can be achieved in interaction with the field overshoot of the electric field by the material having a high electrical refractive index in the second casing region. Furthermore, these transparent line regions can also be used with low conductivity if a poling process of the electro-optical material is required during fabrication.

In a further embodiment, the waveguide component additionally has at least one electrically conductive line region or contact, which is at least partially electrically conductively connected to the waveguide core. This embodiment can be used to apply a direct voltage to the waveguide core, which can be low conductive, if a poling process of the electro-optical material is required during fabrication.

In a further embodiment, the concentration of free charge carriers is less than $10^{19}$ cm$^{-3}$ or less than $10^{18}$ cm$^{-3}$ or less than $10^{17}$ cm$^{-3}$. Free charge carriers lead to optical losses in the waveguide. The lower the charge carrier concentration chosen, the lower the losses in the waveguide and thus in the entire component.

In a further embodiment, the dielectric material in the second casing region is transparent or translucent with respect to light and is configured in such a way that light is at least partially conductive through the second casing region or can be guided therethrough. Transparent materials as the second casing region allow this to be brought close to the waveguide core without increasing the optical losses in the waveguide. The closer the second casing region can be brought to the waveguide, the stronger the modulation field in the direct vicinity of the waveguide core and the higher the efficiency of the component.

In a further embodiment, the dielectric material of the second casing region at least partially comprises or is formed from an organic material. Organic materials can greatly simplify fabrication because they can be deposited from the liquid phase, for example, and no complicated layers have to be grown. Furthermore, organic materials can often be optimally adapted to their intended use by appropriate molecular design. In particular, it is thus possible to optimize organic materials with regard to the highest possible electro-optical coefficient $r_{33}$.

In a further embodiment, the second casing region comprises or is formed from at least one material from the group of dielectric materials, wherein the group of dielectric materials includes, for example, the following compounds: $Al_2O_3$, $ZrO_2$, $ZrSiO_4$, $HfO_2$, $HfSiO_4$, $Pr_2O_3$, $Gd_2O_3$, $Y_2O_3$, $La_2O_3$, $Ta_2O_5$, $TiO_2$, $BaTiO_3$, $SrTiO_3$, or $BaSrTiO_3$ or combinations thereof. These materials or material classes typically have a high electrical refractive index. This ensures that there is a specific difference in the electrical refractive index between the second and first casing material, which enables the field overshoot in the electro-optically active material.

In a further embodiment, the waveguide at least partially comprises or is formed from silicon. Silicon has advantageous properties as a waveguide core. It is transparent to light in the infrared range, which keeps optical losses low, and it has a high optical and a relatively high electrical refractive index. The high refractive index leads to a field overshoot of the light wave and the modulation signal in the electro-optically active first casing region and thus to a high efficiency of the component. Furthermore, silicon simplifies fabrication. The structuring of silicon, in particular on planar substrates, is easily possible with standardized industrial processes, for example from the field of CMOS-based microelectronics.

In a further embodiment, the waveguide component has at least one substrate which has or is at least partially formed from $SIO_2$. $SIO_2$ as substrate material is transparent, which reduces the optical losses in the waveguide. Furthermore, it permits simple manufacture, in particular for a planar arrangement. $SIO_2$ is in particular an important component of so-called silicon-on-insulator—(abbreviated to: SOI-) wafers that have become an important substrate for integrated optical circuits. Existing industrial production processes are available here.

In a further embodiment, the electro-optical material of the first casing region at least partially comprises or is formed from an organic material. Organic electro-optical materials often achieve a very high second-order non-linearity, which allows high component efficiency. Furthermore, organic materials permit simple processing, for example separation from the liquid phase, which further simplifies production.

In a further embodiment, the electro-optical material of the first casing region at least partially comprises or is formed from a ferroelectric material. Ferroelectric materials often have a high second-order non-linearity which can be used in this structure for an efficient component.

In another embodiment, the waveguide core comprises elements having a maximum dimension below the material wavelength or below half the material wavelength of the waveguide core material. Nanostructuring of the waveguide core, for example in the form of so-called sub-wavelength grating waveguides, enables a stronger interaction of the optical wave with the electro-optical casing material. Furthermore, the group velocity of the light wave can be influenced by a corresponding design of the structures and can be adapted, for example, to the propagation speed of the modulation signal, which in turn increases the efficiency of the component (so-called traveling-wave arrangement).

In a further embodiment, the waveguide is at least partially formed by means of photonic crystals or comprises such photonic crystals. These can, for example, reduce the group velocity of the guided light and thus increase the interaction time of the optical field with the electro-optical material. This leads to a high electro-optical interaction on a short path and thus to a higher efficiency with smaller dimensions.

As described above, the use of a dielectric material with a high electrical refractive index leads to an increase in the electrical modulation field in the region of the waveguide and thus to a stronger interaction of the modulation field with the optical carrier in the electro-optical material. Thus, efficient and fast components can be realized without additional optical losses due to conductive regions near the optical waveguide. The general concept of a waveguide-based electro-optical component is described above. It can be realized very well on a waveguide platform with high optical index contrast. The optical refractive index of the waveguide core is preferably more than 1.8 in order to allow a high integration density, and that of the waveguide shell is between 1 and 3, wherein the index difference between the waveguide core and the casing is preferably higher than 0.5, particularly preferably higher than 1. The refractive index of the core is particularly preferred to be above 3 and the refractive index of the casing between 1.3 and 2. The realization in corresponding platforms with waveguide cores of, for example, silicon nitride or silicon permits a very compact design. The cross-section of the waveguide core is preferably smaller than 5 µm$^2$, especially preferably smaller than 1 µm$^2$. An electro-optical material is understood to be a material, which changes its optical properties when interacting with an electric field. In the realization of waveguide-based modulators, the electro-optical material preferably has a Pockels effect with nonlinear coefficients of $r_{33}$>30 pm/V, particularly preferably of $r_{33}$>80 pm/V. The optical refractive index of the electro-optical material is preferably less than 2.4; the electrical refractive index in the frequency range of the electrical modulation signal is preferably less than 10. Electro-optical materials meeting the above-mentioned properties are, for example, organic materials such as SEO100, SEO250, YLD124, PSLD41, or JRD1. The dielectric material with high electrical refractive index ideally has an optical refractive index in the region of the waveguide casing, preferably less than 2.8, especially preferably less than 2.4. The relative dielectric constant $\varepsilon_r$ is preferably at least 40, more preferably at least 90, and most preferably at least 200. The electrical line regions are preferably designed as metallic electrodes, for example made of gold or aluminum. The distance between the electrical line regions and the optical waveguide is preferably selected such that the intensity of the guided optical wave at the line regions is at least a factor of 1000 lower than the maximum intensity in the waveguide. The realization of transparent line regions can be achieved, for example, by indium tin oxide (abbreviated to: ITO) or when using a fabrication platform with silicon waveguides, preferably by lightly doped silicon. The charge carrier concentration for the transparent line regions is here preferably in the range higher than $10^{16}$ cm$^{-3}$ and lower than $10^{19}$ cm$^{-3}$, particularly higher than $10^{17}$ cm$^{-3}$ and lower than $10^{18}$ cm$^{-3}$. If electro-optical materials are used, which require an electrical poling process, this can be simplified via an electrically conductive connection. A direct voltage can be applied for poling via this connection, so that the poling voltage is applied only over the electro-optical material. For this purpose, the charge carrier concentration of the conductive connection is preferably less than $10^{18}$ cm$^{-3}$, more preferably less than $10^{17}$ cm$^{-3}$.

FIG. 1-1 shows, in subfigure 1A, a schematic cross-sectional view of a first embodiment of a device or structure 100A, and in subfigure 1B, a schematic diagram 100B with respect to refractive index and normal components in accordance with subfigure 1A.

Schematic cross-sectional illustrations for different concepts of electro-optical modulators in accordance with at least one of claims 1 to 26, which exploit an increase of the modulation field $E_n$ achieved or reached by dielectric interfaces in the optical waveguide 110. The structure or device 100A shown in subfigure 1A shows the waveguide 110 formed by a waveguide core 120 with a high optical refractive index $n_{opt,120}$ and a first at least partially electro-optical casing region 130, which at least partially surrounds the waveguide core 120, wherein at least one element and/or at least one material can also optionally be additionally arranged between waveguide core 120 and the first casing region 130. A second casing region 140 of dielectric material having a high electrical refractive index $n_{e1,140}$ is at least partially arranged in the region of the waveguide core 120 between at least two electrically conductive regions 150 and the first casing region 130.

Subfigure 1A shows a waveguide component 100A, which comprises at least the following elements: an optical waveguide 110, comprising at least one material having at least partially electro-optical properties or being formed therefrom; at least one one-piece waveguide core 120, comprising at least one material with a high refractive index or being formed therefrom; at least one first casing region 130 of the waveguide 110, comprising at least one material having at least partially electro-optical properties or being formed therefrom; at least one second casing region 140, comprising at least one dielectric material having high permittivity or being formed therefrom; at least two electrically conductive line regions 150, which are preferably realized as metal electrodes or are formed from at least one metal, wherein such metal electrodes comprise at least one material from the group of materials and wherein this group comprises: Iron, aluminum, copper, gold, silver or an alloy of these aforementioned materials. That is, subfigure 1A shows a waveguide component 100A, comprising: a waveguide 110, which is at least partially transparent or translucent to light and configured such that light can be at least partially conducted through the waveguide 110, comprising: a waveguide core 120, wherein the waveguide core 120 is formed at least from one element or of a plurality of elements spatially separated from one another, which comprise at least one waveguide core material or are formed therefrom; a first casing region 130, which comprises or is formed from at least one electro-optical material, wherein the first casing region 130 interacts at least partially with light guided in the waveguide 110, and wherein the first casing region 130 is arranged at least partially around the one element or the plurality of elements of the waveguide core 120; and a second casing region 140 comprising or being formed from at least one dielectric material, wherein the second casing region 140 is at least partially arranged around the first casing region 130 and/or the waveguide core 120; at least two line regions 150, which are at least partially electrically conductive, wherein an electrical modulation signal is applied between the line regions 150, wherein the line regions 150 are arranged at least partially along the optical waveguide 110 in such a way that the line regions 150 are arranged at least partially opposite each other with the waveguide 110 being arranged at least partially between the line regions 150; characterized in that the modulation signal forms an electric field having field lines, which at least partially penetrate both the second casing region 140 and the first casing region 130, and wherein the dielectric material of the second casing region in the frequency range of the modulation signal 140 has a higher electrical refractive index than the electro-optical material of the first casing region 130.

The embodiment 100A shown in subfigure 1A comprises a one-piece waveguide core 120 formed by means of at least one strip waveguide of high optical refractive index. The optical refractive index $n_{opt,120}$ of the waveguide core 120 at the operating wavelength is preferably more than 1.8, particularly preferably more than 2.5, and most preferably more than 3.0. The waveguide core 120 itself need not have electro-optical activity; accordingly, a wide variety of materials may be considered for its production, e.g. semiconductors such as silicon or compound semiconductors, dielectrics such as metal oxides or nitrides having a high refractive index, or organic materials having a correspondingly high refractive index. The waveguide core 120 is surrounded, at least in some regions or partially in the interaction region of a light guided in the waveguide 110, by a first casing region 130, which consists at least partially of an electro-optical active material. In addition, a second casing region 140 is arranged in the region of the waveguide core 120 between the electro-optical material of the first casing region 130 and the electrically conductive line regions 150. The second casing region 140 is made of a dielectric material, which does not necessarily have to have electro-optical properties, but may optionally also have such properties. Critical for the functionality is the fact that the dielectric material of the second casing region 140 has a high electric refractive index nel, 140 in the (electrical) frequency range of the applied modulation voltage, which is greater than the electric refractive index no, 130 of the first casing region 130. This results in an increase in the electrical modulations field in the region of the optical waveguide 110 with low electrical refractive index nel, 130 and therefore in the electro-optically active first casing region 130, which in turn leads to an increased modulation efficiency of the waveguide component 100A, see below. The electrical refractive index $n_{e1,140}$ of the second casing region 140 is preferably greater than 4.5, particularly preferably greater than 8, and most particularly preferably greater than 12, while the electric refractive index $n_{e1,130}$ of the first casing region 130 is preferably lower than 4.5, particularly preferably lower than 3.5, and most preferably lower than 2.9. The ratio between the electrical refractive indices $n_{e1,130}$ and $n_{e1,140}$ of the first and second casing regions 130 and 140 is preferably greater than 2, particularly preferably greater than 3, and most preferably greater than 4. The electric refractive index $n_{e1,120}$ of the waveguide core 120 should be selected as high as possible. It should be noted that precisely this fact distinguishes the structure 100A from the one disclosed in [2]. There, the electro-optical activity is in the waveguide core of the waveguide, and it is desirable to use a material with as small an electrical refractive index as possible in order to maximize the field strength in the waveguide core. This objective is often in conflict with the requirement that the waveguide core must have an optical refractive index that is the same as the first casing region in order to enable an optical light guide at all. This contradiction can be resolved with the present claimed configuration or embodiment 100A, since the requirement for a waveguide core material with a high refractive index, i.e. $n_{e1}$ or $n_{opt}$, both in the electrical and in the optical frequency range, can be met in a much simpler manner and by a substantially larger variety of materials. The optical refractive index $n_{opt}$ of the waveguide core material is preferably above 2.1, particularly preferably above 2.8, and most preferably above 3.3. The optical refractive indices $n_{opt}$ must be selected such that the first casing region 130 has a smaller optical refractive index $n_{opt,130}$ than the optical refractive index $n_{opt,120}$ of the material of the waveguide core 120. The optical refractive index $n_{opt,140}$ of the second casing region 140 may be selected smaller than the optical refractive index $n_{e1,120}$ of the waveguide core 120, but does have to be—in the latter case, the thickness of the first casing region 130 must be selected large enough to prevent optical power being emitted into the second casing region 140.

To explain the operation of the first embodiment 100A, the continuity condition for the normal component $D_n=\varepsilon_0\varepsilon_r E_n$ of the dielectric displacement density D of the modulation field E in the transition from a first casing region or casing region 130 with relative dielectric constant $\varepsilon_{r,130}$ at the interface to a second casing region 140 with relative dielectric constant $\varepsilon_{r,140}$ must be noted. The electric refractive index $n_{e1}$ and relative dielectric constant $\varepsilon_r$ are linked in the case of non-magnetic materials by $n^2_{e1}=\varepsilon_r$ in accordance with the following equations 7 and 8:

$$D_n=n_{e1,130}^2 E_{n,130}=n_{e1,140}^2 E_{n,140}=\text{const.} \quad (7),$$

and $$E_{n,130}/E_{n,140}=n_{e1,140}^2/n_{e1,130}^2 \quad (8).$$

In the case of low electric refractive indices no, 130 in the first casing region 130 and high electric refractive indices $n_{e1,140}$ in the second casing region 140, i.e. the following ratio applies between the above-mentioned electrical refractive indices $n_{e1,140} \gg n_{e1,130}$, the modulation field strength $E_{n,130}$ in the electro-optically active first casing region 130 is significant or significantly higher than the field strength $E_{n,140}$ in the second casing region 140.

In subfigure 1B, the course of the electrical refractive index no and the course of the electric modulation field $E_n$ in the center of the waveguide cross-section of the embodiment 100A are shown in a schematic diagram 100B.

The electric refractive index no and normal components of the electric modulation field $E_n$ along the cross-section of the structure 100A are schematically shown in subfigure 1A. The cut line is plotted as a perpendicular dotted line in subfigure 1A. The differences in electrical refractive indices, i.e. the following applies: $n_{e1,130} \neq n_{e1,140}$, in the electro-optical material of the first casing region 130 and in the dielectric material of the second casing region 140 result in an increased electric modulation field En in the waveguide core 120 due to a discontinuity at the interface.

A modulation voltage applied across the electrically conductive line regions 150 decreases substantially over the first casing region 130 when the waveguide geometry and the electrical refractive indices nel, 120, 130, 140 of the casing and waveguide materials are selected in a suitable manner. The material of the waveguide core 120 preferably has an electrical refractive index $n_{e1,120}$ higher than or equal to the electric refractive index $n_{e1,130}$ of the first casing region 130.

In the case of a given or applied modulation voltage, the electrical modulation field $E_n$ for this embodiment 100A is concentrated on the first casing region 130 having a low electrical refractive index $n_{e1,130}$, which leads to an increased or enhanced interaction between the modulation field $E_n$ and the light wave in the nonlinear electro-optical casing material when a dielectric casing material is used in the second casing region 140 having an electrical refractive index of nel, 140 above the electrical refractive index nel, 130 of the electro-optical material in the first casing region 130. The materials having a high electrical refractive index $n_{e1}$ in the frequency range up to several hundred gigahertz include oxides, particularly transition metal oxides (e.g. $ZrO_2$, $HfO_2$, $La_2O_3$, $Ta_2O_5$, $Y_2O_3$, $TiO_2$, ...), titanates (e.g. $BaTiO_3$, $SrTiO_3$, $BaSrTiO_3$, ...), silicates (e.g. $HfSiO_4$, $ZrSiO_4$, ...), or combinations thereof, i.e. such materials are suitable for forming the second casing region 140. In other words, the second casing region 140 may comprise or be formed from at least one of the aforementioned oxides. However, other dielectric materials may also be used, e.g. based on organic compounds. Optionally, the structure 100A claimed herein may also use materials having electro-optical effects in the waveguide core 120, which increase or enhance electro-optical interactions resulting from the first casing region 130.

FIG. 1-2 shows in the subfigures 1C to 1F four schematic cross-sectional views of further embodiments of the devices 100C, 100D, 100C and 100F.

Subfigure 1C shows a further embodiment 100C based on the embodiment 100A in accordance with subfigure 1A and its description with a two-part waveguide core 121, wherein such a two-part waveguide core 121 is formed by at least two elements, which are spatially separated from each other in such a way that a slot is formed between these elements. In the slot, which is at least partially filled with electro-optical material 130, both the optical carrier field and the electrical modulation field $E_n$ are amplified by discontinuities at dielectric interfaces. In other words, the waveguide core 121 comprises or is formed of at least two parts, which are spatially separated from each other by a slot (optical slot waveguide). The slot is at least partially filled with the electro-optical material belonging to the first casing region 130 having an optical refractive index $n_{opt,130}$ lower than that of the two-part waveguide core 121 (slot waveguide). The difference in the optical refractive indices $n_{opt,121}$ of the waveguide core 121 and $n_{opt,130}$ of the first casing region 130 is preferably greater than or equal to 0.5, particularly preferably greater than or equal to 1, and very particularly preferably greater than or equal to 1.5. In this or in such a geometry, the discontinuous field overshoot of the normal component of the electric light field $E_n$ at the side walls of the slot and at the interfaces of the waveguide core 121 oriented towards the electrically conductive line regions 150 is utilized to concentrate a large part of the electric field $E_n$ of the optical wave or the light in the slot and thus in the material of the first casing region 130, in accordance with the following equations 9 and 10:

$$D_n=n_{opt,130}^2 E_{n,130}=n_{opt,121}^2 E_{n,121}=\text{const.} \quad (9),$$

and $$E_{n,130}/E_{n,121}=n_{opt,121}^2/n_{opt,130}^2 \quad (10).$$

The normal optical component of the electric field strength $E_n$ becomes particularly large, if a dominant vertically polarized optical field is preferably selected. As a measure for the interaction of a light guided in waveguide 110 with the casing material, the field interaction factor Γ in accordance with the following equation 11 is usually used, which is described here under the assumption that the optical field is polarized in the x-direction, $$\Gamma = \frac{n_{opt,130}}{Z_0} \frac{\int_{A_{130}} |E_x|^2 dA}{2P(\omega_c)}. \quad (11)$$

The field interaction factor F describes the proportion of the optical field, which interacts with the modulation field in the electro-optical casing material, assuming that the corresponding tensor element of the nonlinear susceptibility is not zero. $E_x$ is the x component of the optical field, P is the power of the optical field, $n_{opt,130}$ is the refractive index of the electro-optical material, $Z_0$ is the characteristic impedance in vacuum and $A_{130}$ is the cross-sectional region, in which the optical field interacts with the modulation field in the electro-optical material.

This structure also allows the electric modulation field $E_n$ in the first casing region 130 directly surrounding the two-part waveguide core 121 to be increased by arranging a second casing region 140 made of dielectric material having a high electric refractive index 140 in the region of the waveguide core 120 between the electrically conductive line regions 150 and the electro-optical material of the first casing region 130. The combination of optical and electrical field overshoot leads to a particularly strong interaction of the electrical and the optical field in the electro-optical material in the slot.

Subfigure 1D shows another embodiment 100D based on the embodiment 100C in accordance with subfigure 1C and its description. In this case, the second casing region 140 is directly connected to the waveguide core 122, wherein the waveguide core 122 is realized here in this embodiment 100D as a two-part waveguide core. The dielectric material having a high electrical refractive index $n_{e1,140}$ of the second casing region 140 is directly connected to the two-part waveguide core 122 of an optical slot waveguide. Here, too, the optical and electrical field overshoot at interfaces between regions having a high and low refractive index $n_{e1}$ leads to a strong interaction of the fields having the electro-optical material in the slot belonging to the first casing region 130.

Subfigure 1E shows another embodiment having a multipart waveguide core 123 with electro-optical material as the first casing region 130, which is connected to electrically conductive line regions 150 via respective transparent, electrically conductive regions 151. Between the waveguide core 123 and the line regions 150, a material having a high electrical refractive index $n_{e1,140}$ is arranged as a second casing region 140, which leads to an increase of the electric modulation field $E_n$ in the electro-optical material adjacent to the waveguide core 123. Here, optically transparent line regions 151 connect the individual parts of a multipart waveguide core 123 to electrically conductive line regions 150. The electro-optical material of the first casing region 130 fills the slot between the parts of the waveguide core 123. The second casing region 140 made of dielectric material having a high electrical refractive index nel is arranged between the electrically conductive line regions 150 and the first casing region 130. Similar to subfigure 1D, the second casing region 140 may also be directly connected to the waveguide core 123 or arranged thereon. In case of moderate conductivity of the transparent line regions 151, this structure 100E achieves a high field strength for low frequencies of the electrical modulation field $E_n$ in the slot (low-pass characteristic). In conjunction with the field overshoot of the electric field $E_n$ by the material with high electrical refractive index $n_{e1,140}$ in the second casing region 140, which is also effective for very high frequencies, an optimum frequency response can be achieved. Furthermore, these transparent line regions 151 can also be used with low conductivity if a poling process of the electro-optical material is required during fabrication. The poling of electro-optical materials is the alignment of molecules or domains of an electro-optical material so that a macroscopic electro-optical effect is formed in the poled material volume. This can be achieved in electro-optical materials with molecules that have, for example, a dipole moment, inter alia, by generating a strong electric field via a direct voltage, and the molecules align themselves with the field lines of this field. A direct voltage can be applied via the transparent line regions 151 during the poling process, so that a strong electric field is formed in the slot thus enabling polarity.

Since only very low conductivities are required for a direct voltage, a structure for poling can also be achieved, for example, with components of the embodiments 100C or 100D in accordance with subfigure 1C or subfigure 1D. In this case, the waveguide core, 121 or 122, is slightly electrically conductive, which can be achieved, for example, in silicon by slight doping. Outside the modulator structure, a part of the waveguide core 123 is electrically connected to at least one specific poling electrode (not illustrated herein), see for example poling electrode 153 in accordance with the embodiment 300B from subfigure 3B in FIG. 3-1. A direct voltage can now be applied via these poling electrodes 153 and the low-conductivity parts of the waveguide core during fabrication so that the electro-optical material in the slot can be poled.

Subfigure 1F shows another embodiment 100F based on the embodiment in accordance with subfigure 1E and its description, wherein this embodiment having a one-piece waveguide core 124, which is connected or electrically conductively connected to a transparent, electrically conductive line region 150 with a transparent, electrically conductive region 151. A transparent line region 151 connects at least a portion 124 of the waveguide core to an electrically conductive line region 150. The first casing region 130 is made of electro-optical material. A dielectric material having a high electrical refractive index nel, 140 in the second casing region 140 is placed between the electro-optical material and the electrically conductive regions, 150 and 152, so that the electric modulation field $E_n$ in the electro-optical material of the first casing region 130 is increased at a given or applied modulation voltage. The effect is equivalent to structure 100E depicted in subfigure 1E and its description.

The line regions 150 and 152 are preferably metal electrodes, wherein such line regions are formed from at least one of the aforementioned materials or at least partially comprise such a material.

The concept of single or multipart waveguide cores, 120, 121, 122, 123 or 124, in combination with a casing, 130 and 140, made of partially non-linear electro-optical, partially linear materials with a high electrical refractive index $n_{e1}$ can also be generally applied to other structures. For a high modulation efficiency, the most possible interaction of the optical field with the electrical modulation field $E_n$ is required. This interaction in the electro-optical material is increased by an overshoot of the optical field and the electrical modulation field $E_n$. To this end, as described in the above sections, the continuity condition for the normal component of the dielectric displacement density $D_n$ at dielectric interfaces is utilized.

In addition to the embodiment of the waveguide core, 120, 121, 122, 123 or 124, as a strip or slot waveguide, it can also be formed by periodic or non-periodic structures having structural details substantially smaller than the optical wavelength, for example with a waveguide core consisting of blocks of materials having a high refractive index nel arranged unconnected along the propagation direction of the light (so-called "sub-wavelength grating waveguides"). These structures can be embodied both as strip waveguides and as slot waveguides and enable a stronger interaction of the optical wave with the electro-optical casing material. Furthermore, the waveguide core or surrounding regions along the propagation direction can be structured such that the propagation properties of the optical mode are advantageously influenced. These include, for example, so-called "slow light structures", which reduce the group velocity of the guided light and thus increase the interaction time of the optical field with the electro-optical material. This leads to a high electro-optical interaction on a short path. "Slow light structures" can be realized, for example, by photonic crystals. Structures can also be realized, which adapt the group velocity of the optical field to that of the electrical modulation wave.

FIGS. 2-1 and 2-2 show schematic cross-sectional drawings of the concepts for electro-optical modulators, in a lateral arrangement, similar to FIGS. 1-1 and 1-2 and their description. Subfigures 2A, 2B, 2C, 2D and 2E correspond in structure and function to their counterparts 1A, 1C, 1D, 1E and 2F in FIGS. 1-1 and 1-2 with the difference that in this case the structures 200A to 200E are each arranged laterally on an optically transparent substrate 160. In other words, in the case of these embodiments, 200A to 200E, the at least one waveguide core, 120, 121, 122, 123 or 124, the at least one first casing region 130, the at least one second casing region 140 and the at least two electrically conductive line regions 150 are arranged sideways or laterally over at least one substrate 160, analogous to the embodiments 100A and 100C to 100F in the subfigures 1A and 1C to 1F in the FIGS. 1-1 and 1-2 and their description, wherein at least one additional cover layer 170 is also arranged above such an arrangement and wherein the substrate 160 is formed from at least one layer. One or more cover layers 170 can thus also be applied over the first casing region 130. Herein, the term "lateral arrangement" is to be understood to mean an arrangement, which is oriented or formed sideways from the center of the body in each case. Thus, by analogy to the embodiments 100A and 100C to 100F from the FIGS. 1-1 and 1-2 and their description, it is to be understood that these disclosed embodiments 100A and 100C to 100F are arranged sideways or laterally over a substrate 160 in accordance with the embodiments 200A to 200E and their descriptions.

As explained above, it is advantageous to use commercially available and scalable manufacturing processes for the production of electro-optical modulators in accordance with at least one of claims 1 to 26. To this end, it is particularly advantageous to use lateral structuring instead of vertical structuring of the component, whereby first the optical waveguide core, i.e. 120, 121, 122, 123 or 124, the electrically conductive line regions 150 and 152, and the dielectric structures belonging to the second casing region 140 are produced in a planar arrangement, onto which the electro-optically active material can then be applied with comparatively low requirements with regard to layer thickness, layer quality and lateral dimensions. FIGS. 2-1 and 2-2 shows such lateral arrangements of structures, similarly to the general component concepts or embodiments illustrated in FIGS. 1-1 and 1-2 and their description above. An optically transparent material functions as substrate and simultaneously as lower waveguide casing 160. This can be, for example, at least partially an oxide such as $SiO_2$, $Al_2O_3$, . . . or at least partially formed therefrom or have such an oxide. In production, the waveguide core or its components, i.e. 120, 121, 122, 123 or 124), the second casing region 140 made of dielectric material with a high electrical refractive index $n_{e1}$, the transparent line regions 151, and the electrically conductive line regions 150 can be deposited next to one another on the substrate by conventional lateral structuring methods, before the first casing region 130 made of at least partially electro-optical material and possibly further cover layers 170 are applied, wherein such cover layer or cover layers comprise at least one material from the group of cover layer materials, wherein this group comprises for example: Crystalline structures or amorphous structures (for example glasses) based on oxides such as, for example, $SiO_2$, nitrides such as $Si_3N_4$ or organic materials such as polymers and epoxide. The cover layer may be transparent. It provides protection against mechanical damage. The cover layer materials are typically electrically insulating, whereby passivation of the component is achieved. Furthermore, the cover layer materials can protect the component from environmental influences such as moisture or oxygen. In these arrangements or embodiments, 200A to 200E, it is in particular not necessary to deposit further layers with high electrical or optical quality and possibly a crystalline crystal structure on the electro-optical material of the first casing region 130. This drastically simplifies production and at the same time expands the spectrum of the electro-optical materials that can be used. This makes it possible, in particular, to introduce, for example, organic materials of the first casing region 130 from the liquid phase into the prestructured component. It is not necessary to remove the substrate for these structures. In other words, the substrate or the waveguide casing 160 may be at least partially part of the respective embodiment 200A to 200E.

In embodiment 200A in subfigure 2A in FIG. 2-1, a lateral structure is arranged above a substrate or waveguide casing 160, which is formed analogously to embodiment 100A in subfigure 1A in FIG. 1-1 and its description. In this structure, at least one first casing region 130 is arranged laterally or sideways at least partially around a one-piece waveguide core 120 or surrounding it at least partially, and in each case at least one second casing region 140 is arranged at least partially on both sides of the first casing region 130. In addition, at least one electrically conductive line region 150 is arranged laterally or sideways in this structure at least partially on both sides of the second casing region 140. In embodiment 200A, the first casing region 130 extends over the lateral structure in such a way that the one-piece waveguide core 120 and the two second casing regions 140 and the two electrically conductive line regions 150 are at least partially surrounded by the first casing region 130, wherein the first casing region 130 only partially surrounds the regions of the lateral structure that do not adjoin the substrate or waveguide casing 160. In this embodiment 200A, the first casing region 130 forms a first cover layer above the lateral structure, wherein at least one further or at least one additional cover layer 170 is arranged above this cover layer, wherein the cover layer 170 can also optionally be formed from more than one layer or have several layers.

In embodiment 200B in subfigure 2B in FIG. 2-1, analogous to embodiment 100C in subfigure 1C in FIG. 1-2 and its description, the structure disclosed therein is arranged laterally or sideways above a substrate or waveguide casing 160. In this structure, at least one first casing region 130 is arranged laterally or sideways at least partially around a two-part waveguide core 121 (analogous to the above-mentioned embodiment 100C) or surrounds it at least partially and at least one second casing region 140 is arranged respectively at least partially on both sides of the first casing region 130; wherein in this embodiment 200B the second casing region 140 and the two-part waveguide core 121 are spatially separated from each other. In addition, at least one electrically conductive line region 150 is arranged laterally or sideways in this structure at least partially on both sides of the second casing region 140. In embodiment 200B, the first casing region 130 extends at least partially within the slot of the two-part waveguide core 121 or between the two elements of the two-part waveguide core 121 and over the lateral structure in such a way that the two-part waveguide core 121 and the two second casing regions 140 and the two electrically conductive line regions 150 are surrounded at least partially by the first casing region 130, wherein the first casing region 130 only partially surrounds the regions of this lateral structure that are not adjacent to the substrate or waveguide casing 160. In this embodiment 200A, the first casing region above this lateral structure forms a first cover layer, wherein at least one further cover layer or at least one additional cover layer 170 is arranged above this cover layer, wherein the cover layer 170 can also be optionally formed from more than one layer or have several layers.

In embodiment 200C in subfigure 2C in FIG. 2-2, analogous to the embodiment 100D in subfigure 1D in FIG. 1-2 and its description, the structure disclosed therein is arranged laterally or sideways over a substrate or waveguide casing 160. In this structure, at least one first casing region 130 is arranged laterally or sideways at least partially around a two-part waveguide core 122 (analogous to the above-mentioned embodiment 100D) or surrounds it at least partially and at least one second casing region 140 is arranged respectively at least partially on both sides of the first casing region 130, wherein in accordance with this embodiment 200C, the two-part waveguide core 122 at least partially directly adjoins the second casing region 140. In addition, at least one electrically conductive line region 150 is arranged laterally or sideways in this structure at least partially on both sides of the second casing region 140. In embodiment 200C, the first casing region 130 extends at least partially within the slot of the two-part waveguide core 122 or between the two elements of the two-part waveguide core 122 and over the lateral structure in such a way that the two-part waveguide core 122 and the two second casing regions 140 and the two electrically conductive line regions 150 are surrounded at least partially by the first casing region 130, wherein the first casing region 130 only partially surrounds the regions of this lateral structure that are not adjacent to the substrate or waveguide casing 160. In this embodiment 200C, the first casing region 130 forms a first cover layer above the lateral structure, wherein at least one further cover layer or at least one additional cover layer 170 is arranged above this cover layer, wherein the cover layer 170 can also be optionally formed from more than one layer or have several layers.

In embodiment 200D in subfigure 2D in FIG. 2-2, analogous to the embodiment 100E in subfigure 1E in FIG. 1-2 and its description, the structure disclosed therein is arranged or formed laterally or sideways over a substrate or waveguide casing 160. In this structure, at least one first casing region 130 is arranged laterally or sideways at least partially around a two-part waveguide core 123 (analogous to the above-mentioned embodiment 100E) or surrounds it at least partially and at least one second casing region 140 is arranged respectively at least partially on both sides of the first casing region 130, wherein in this embodiment 200D the second casing region 140 and the two-part waveguide core 123 are spatially separated from each other. Moreover, one element of the two-part waveguide core 123 and one of the electrically conductive line regions 150 are respectively electrically conductively connected to one another by means of a transparent electrically conductive line region 151, wherein a second casing region 140 is respectively arranged at least partially over one of the two transparent electrically conductive line regions 151. In addition, at least one electrically conductive line region 150 is arranged laterally or sideways in this structure at least partially on both sides of the second casing region 140. In embodiment 200D, the first casing region 130 extends at least partially within the slot of the two-part waveguide core 123 or between the two elements of the two-part waveguide core 123 and over the lateral structure in such a way that the two-part waveguide core 123 and the two second casing regions 140 and the two electrically conductive line regions 150 are surrounded at least partially by the first casing region 130, wherein the first casing region 130 only partially surrounds the regions of this lateral structure that are not adjacent to the substrate or waveguide casing 160. In this embodiment 200D, the first casing region 130 forms a first cover layer above the lateral structure, wherein at least one further cover layer or at least one additional cover layer 170 is arranged above this cover layer, wherein the cover layer 170 can also be optionally formed from more than one layer or have several layers.

In embodiment 200E in subfigure 2E in FIG. 2-2, a lateral structure is arranged above a substrate or waveguide casing 160, which is formed analogously to embodiment 100F in subfigure 1F in FIG. 1-2 and its description. In this structure, at least one first casing region 130 is arranged laterally or sideways at least partially around a one-piece waveguide core 124 or surrounds it at least partially. The waveguide core 124 is at least partially arranged over a transparent, electrically conductive region 151 or formed above it. At least one electrically conductive line region 150 is arranged laterally on each side of the casing region 130, wherein the two line regions 150 are electrically conductively connected to each other by means of the transparent, electrically conductive region 151. At least one second casing region 140 is at least partially arranged or formed over the waveguide core 124 and the first casing region 130. An additional, electrically conductive line region 152 is arranged or formed at least partially over the second casing region 140.

Figure 3:
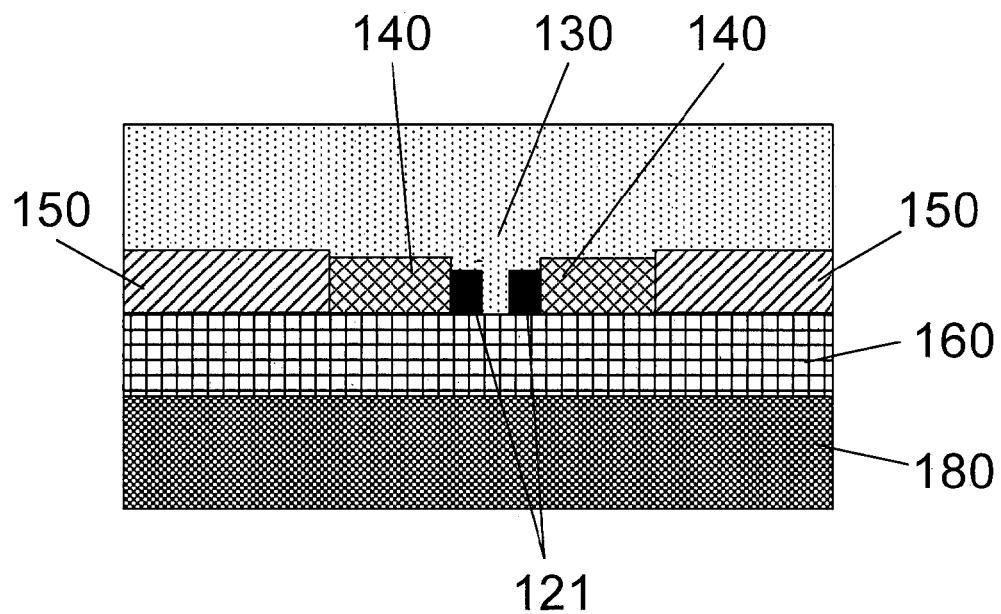
Figure 1:
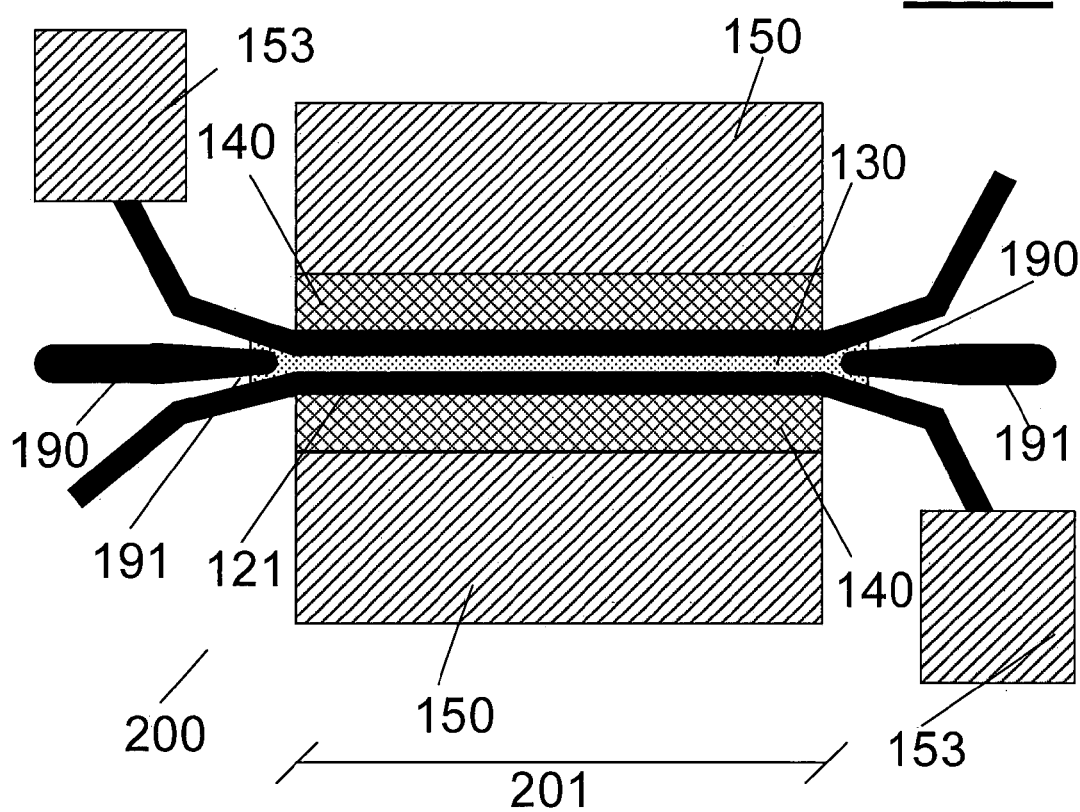
Figure 3:
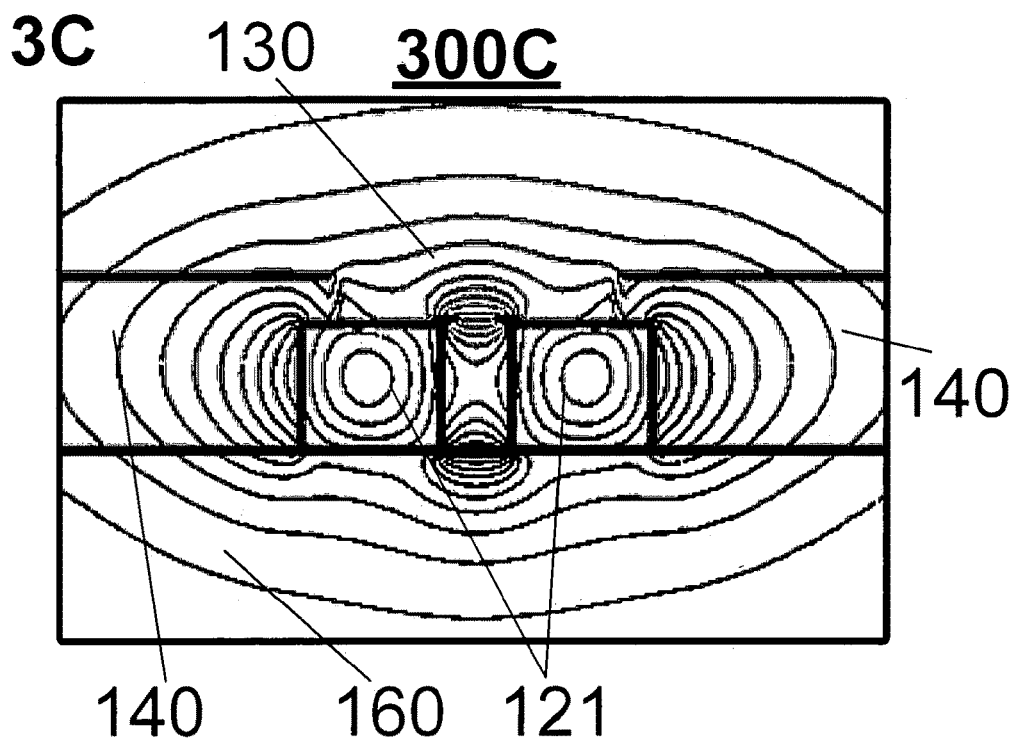
Figure 2:
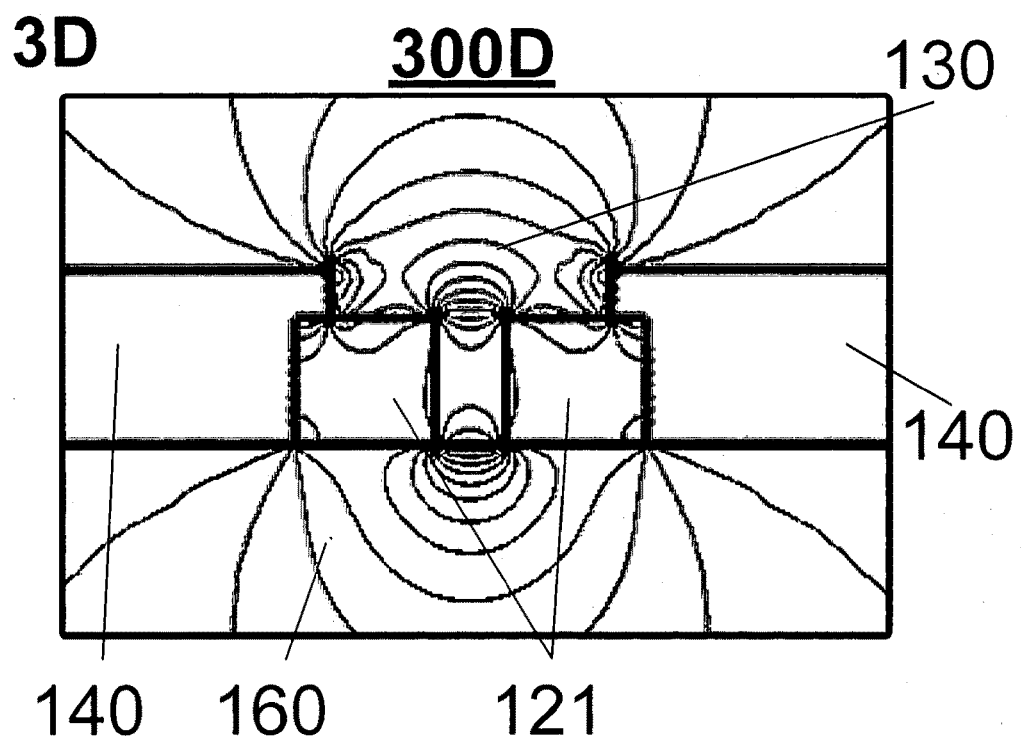

FIG. 3-1 shows in subfigures 3A and 3B two schematic cross-sectional views of further embodiments 300A and 300B of devices. Embodiments 300A and 300B are embodiments of capacitively coupled SOH modulators.

Embodiment 300A has a similar structure to embodiment 200C in subfigure 2C in FIG. 2-2 and is therefore formed laterally. A lateral structure is arranged therein above a substrate 160, which is at least partly arranged above a semiconductor layer 180, in order to ensure a mechanical stabilization of the substrate 160. This lateral structure is formed similar to the embodiment 200C and comprises at least one at least two-part slot waveguide core 121, at least one first casing region 130, at least one second casing region 140 and at least two electrically conductive line regions 150 or is formed therefrom. The intermediate space in the slot waveguide core 121 is filled at least partially by means of the first casing region 130. A second casing region 140 is arranged directly adjacent to the slot waveguide core 121, laterally or sideways on both sides respectively. In turn, an electrically conductive line region 150 is arranged laterally on both sides of the two second casing regions 140. The first casing region 130, which fills at least partially the intermediate space in the slot waveguide core 121, extends additionally at least partially over the lateral structure, which is formed by at least the slot waveguide core 121, the two second casing regions 140 and the two electrically conductive line regions 150.

In other words, an embodiment 300A comprises a silicon slot waveguide 121, which is at least partially embedded in a first electro-optic casing material 130, and at least one or more second dielectric casing regions 140 and electrically conductive line regions 150. The dielectric material of the second casing region or of the second casing regions 140 directly adjoins the electrically conductive line regions 150 and the slot waveguide core 121. The component can be realized on a standardized SOI platform with 3 μm thick buried oxide or substrate 160 and silicon base wafer or semiconductor layer 180 with conventional lateral structural methods, wherein this structuring method comprises at least one method from the group of structuring methods, and wherein this group comprises: Optical lithography methods such as photolithography and UV lithography, but also electron beam lithography, and dry etching processes or wet-chemical etching processes.

A cross-section of embodiment 300A of a capacitively coupled SOH phase modulator is schematically illustrated in subfigure 3A. The dimensions recited below relate to an optical vacuum wavelength of approx. 1550 nm and a height of the silicon waveguide of approximately $h_{silicon}$=220 nm. The dimensions have merely exemplary character for an exemplary embodiment in accordance with the aforementioned dimensions and are to be adapted accordingly for other wavelengths or waveguide thicknesses deviating therefrom. The optical waveguide core is formed by a slot waveguide core 121 made of e.g. silicon, the individual strips preferably have a width $w_{rail}$ e.g. in a range from approximately 100 nm up to approximately 500 nm, particularly preferably the $w_{rail}$ is in a range from approximately 150 nm up to approximately 350 nm; the width of the slot wslot is preferably e.g. in a range from approximately 30 nm up to approximately 400 nm, the wslot is particularly preferably e.g. in a range from approximately 60 nm up to approximately 250 nm. Directly adjacent thereto, the dielectric material of the second casing region 140 is deposited with a high electrical refractive index, with a width $W_{dielectric}$, which preferably lies, for example, in a range from about 0.2 μm to about 5 μm, particularly preferably in a range from about 0.5 μm to about 3 μm, and a height $h_{dielectric}$, which lies, for example, preferably in a range from 50 nm to about 500 nm. A typical material that can be processed well as a thin film is titanium dioxide. Other possibilities include hafnium oxide, barium titanate or barium strontium titanate. These materials typically have a relative dielectric constant $\varepsilon_r$ e.g. in a range from about 50 up to about 500 in a frequency range up to about 100 GHz and an optical refractive index n e.g. less than or equal to n=2.5 at 1550 nm. Metal electrodes or electrically conductive line areas 150 are connected to the dielectric material of the second casing region; these have, e.g., a height hmetal of at least =50 nm and are designed in the present exemplary embodiment as a coplanar, differential traveling wave electrode with a characteristic impedance of 50 Ohm. As upper casing material of the first casing region 130 for such an optical waveguide e.g. an electro-optical material is used with e.g. a relative electric dielectric constant Er, which is typically e.g. in a range from about 5 up to about 10, a typical optical refractive index n in a range from about 1.5 up to about 2.0 and an electro-optical coefficient $r_{33}$ of preferably more than $r_{33}$=30 pm/V, especially preferably more than $n_{33}$=80 pm/V.

One embodiment 300B for the capacitively coupled silicon organic hybrid modulator is the implementation as a phase modulator based on a silicon-on-insulator (or SOI) slot waveguide, see subfigure 3B in FIG. 3-1. Standard SOI strip waveguides (exemplary width $w_{strip}$=500 nm, exemplary height $h_{silicon}$=220 nm) are used as a connection waveguide 190 for optical connection of the modulation range 201. The modulation region 201 is realized by a capacitively coupled SOH structure. To this end, a strip waveguide 190 is connected in a strip-to-slot coupler structure 191 to a SOH slot waveguide 121.

Subfigure 3B shows a schematic cross-sectional view of a phase modulator in accordance with embodiment 300B based on embodiment 300A. Such SOI strip waveguides 190 are used as access waveguides. In strip-to-slot converters 191, the optical field is coupled into a slot waveguide. The dielectric material of the second high permittivity casing region 140 is laterally connected to both the waveguide and the metal electrodes or the electrically conductive line region 150. Special poling electrodes 153 allow direct contact between the two parts of the slot waveguide core 121 and poling of the electro-optical material of the first casing area 130 is achieved with comparatively low direct voltages.

FIG. 3-2 shows in subfigures 3C and 3D two schematic field diagrams in accordance with embodiments 300A and 300B in subfigures 3A and 3B. The reference numerals herein: 121, 130, 140 and 160 in both subfigures 3A and 3B relate to the regions or their physical properties in accordance with the embodiments 300A and 300B, i.e. substrate 160, first casing region 130, second casing region 140 and slot waveguide 121. Representation 300C of subfigure 3C shows a simulated $E_x$ component of the optical field in the slot waveguide core 121 depicted by means of isolines. A significant portion of the field is concentrated in the slot. Representation 300D of subfigure 3D shows a simulated $E_x$ component of the electrical modulation field at 40 GHz depicted by means of isolines. The dielectric material of the second casing region 140 with high electrical permittivity increases the field in the slot by a discontinuity at the surface facing the slot waveguide core 121 and provides a high overlap with the optical mode in the non-linear material. Both fields are highly concentrated in the slot and thereby have an adequate overlap with the electro-optical casing material of the first casing region 130. Simulations yield a field interaction factor of typically Γ=0.15 to 0.25. This is comparable to that of conventional SOH modulators (cf. [5]). During fabrication, organic electro-optical materials have to be activated by a so-called poling process (cf. [5]). To generate the necessary electric field, direct voltage is applied via electrodes of the phase modulator. In embodiment 300B, the voltage is applied to special poling electrodes 153. These poling electrodes 153 are close to the strip-to-slot converter 191 and are electrically conductively connected to at least part of the slot waveguide core 121 without interacting with the optical or electric field, cf. subfigure 3B in FIG. 3-1. As a result, the poling field does not have to be applied over the dielectric material of the second casing region 140 and the necessary poling voltage can be significantly reduced. Since the field strength $E_{pol}$ is decisive for the poling, which via $E_{pol}=U_{pol}/d$ depends both on the applied voltage $U_{pol}$ and the distance d between the electrodes, the distance d can be significantly reduced when the poling electrodes 153 and the weakly conductive slot waveguide 121 are used, so that, for example, only a few 10 V poling voltage are required instead of a few 100 V. To this end, the silicon waveguide core 121 is slightly electrically conductive with very low doping, which does not lead to significant optical losses. Alternatively, the slot waveguide core 121 can be poled via the more distant metal electrodes or electrically conductive line regions 150 and a correspondingly increased voltage. Since this voltage is required once during fabrication for poling, this has no effect on the efficiency of the component.

FIG. 4-1 shows in subfigures 4A to 4C three schematic cross-sectional views of further embodiments of devices or further exemplary embodiments 400A or 400B and 400C of a capacitively coupled SOH modulator on the SOI platform. Subfigure 4A shows a cross-section of an embodiment 400A, which is based, for example, on the previously described embodiment 200A from subfigure 2A in FIG. 2-2, wherein this arrangement is arranged in accordance with 200A on a silicon base wafer or semiconductor layer 180 for stabilization. Embodiment 400A and 400B of a capacitively coupled SOH modulator is based on a strip waveguide core. Subfigure 4B shows a top view of the cross-section of the embodiment 400A in subfigure 4A in accordance with the cutting direction A-A in subfigure 4A of a phase modulator with strip waveguide and capacitively coupled electrodes with strip waveguide cores 120. Instead of the slot waveguide in subfigure 3A of FIG. 3-1, a narrow strip waveguide 120 is used, see subfigures 4A and 4B. The strip waveguide core 120, which is at least partially formed of silicon, is used as waveguide core. The electro-optical material of the first casing region 130 surrounding it at least partially forms a waveguide casing. The dielectric material of the second casing region 140 of high permittivity in a previously defined distance 400-6, also referred to herein as $w_{gap}$, to the waveguide core concentrates the electric modulation field, which is embossed by the metal electrodes or the electrically conductive line regions 150 in the vicinity of the waveguide core 120 without disturbing the optical wave. This means that the metal electrodes are far enough from the waveguide so that the light wave guided in the waveguide does not interact substantially with the conductive metal electrodes, which would lead to damping of the light wave. The width 400-5 (herein also referred to as $w_{strip}$) is e.g. preferably in a range from approximately 100 nm up to approximately 500 nm, particularly preferred is e.g. $w_{strip}$ or 400-5 in a range from approximately 200 nm up to approximately 350 nm. Here, too, the optical field has a suitable overlap with the electro-optical casing material of the first casing region 130. The overlap is preferably greater than 10%, particularly preferably greater than 20% and particularly preferably greater than 40%. The dielectric material with a high electric refractive index of the second casing region 140, which comprises or is at least partially formed from at least one of the group of materials, wherein the group comprises for example: Barium titanate, barium strontium titanate or titanium dioxide; begins at a defined distance 400-6 from the waveguide core, so that the electro-optical material of the first casing region 130 forms the waveguide casing and the electric and optical field is concentrated in this region. The distance $w_{gap}$ or 400-6 between the waveguide core 120 and the dielectric material of the second casing 140 is e.g. preferably in a range from approximately 50 nm to approximately 1000 nm, particularly preferably in a range from approximately 100 nm to approximately 500 nm. The metal electrodes or electrically conductive line regions 150 are placed, for example, at a distance of preferably $w_{gap}$+$W_{dielectricum}$>1 µm from the waveguide core.

Subfigure 4C shows a top view of another embodiment 400C of a capacitively coupled SOH modulator with a so-called sub-wavelength grating waveguide 125, i.e. in other words, the slot waveguide core 125 is realized as a sub-wavelength grating waveguide. The waveguide core may also be designed as sub-wavelength grating (abbreviated to: SWG) waveguides 125, see subfigure 4C for a top view. In this case, the waveguide core consists of regularly arranged individual elements with gaps and dimensions that are significantly below the wavelength of the optical light in the selected materials. Periodic or quasi-periodic structures with periods of less than 300 nm are preferably used for a wavelength of optical light of 1550 nm.

FIG. 4-2 shows in subfigures 4D to 4F three schematic cross-sectional views of further embodiments of devices or further exemplary embodiments 400D or 400E and 400F, wherein these are arranged on a silicon base wafer or semiconductor layer 180 for stabilization. Subfigure 4E shows a plan view of a cross-section according to the embodiment 400D in accordance with cutting direction B-B in subfigure 4D. Subfigures 4D and 4E illustrate an exemplary embodiment of a capacitively coupled SOH modulator with slot waveguide 123, which is at least partially formed from silicon or at least partially comprises it, which is coupled or connected to the electrodes 150 with thin, transparent conductive regions 151. At low frequencies, the applied voltage drops completely across the slot filled with electro-optic material 130. At higher frequencies, capacitive coupling is dominated by the dielectric material 140, which is deposited between slot waveguide 123 and electrodes on the conductive regions 151. A further embodiment of a capacitively coupled SOH modulator comprises a slot waveguide 123, similar to or based on the embodiment 300A shown in subfigure 3A in FIG. 3-1. In addition, the waveguide core 123 with a thin transparent conductive region 151 made of silicon is directly connected to the electrodes 150 in an electrically conductive manner, see subfigures 4D and 4E. The thickness 400-4 or $h_{slab}$ of the electrically conductive region 151, for example, is preferably in a range from approximately 10 nm to approximately 200 nm, especially preferably in a range from about 20 nm to about 80 nm. Due to this resistive coupling, the applied voltage drops completely over the slot at low frequencies, which slot is at least partially filled with electro-optical material of the first casing region 130. At higher frequencies, capacitive coupling is dominated by the dielectric material of the second casing region 140, which is deposited between waveguide core 123 and electrodes or the electrically conductive line regions 150 on the transparent, electrically conductive region 151. Since, due to the resistive coupling, the applied voltage drops even at low frequencies mainly above the slot, the increase in the electric field can be maintained over the entire frequency range up to the direct voltage, even if the electro-optical material of the first casing region 130 has a low electrical conductivity in the slot of the waveguide core 123. To this end, it is in particular not necessary to provide the transparent electrically conductive regions 151 with a high degree of doping, which leads to optical losses. Furthermore, the resistive coupling of the slot waveguide 123 allows an efficient poling of the electro-optical material of the first casing region 130 located in the slot of the slot waveguide 123 with small applied voltages. In exemplary embodiment 400E, the slot in the slot waveguide 123 comprises a predetermined width 400-8 or wslot, which is, for example, preferably in a range from about 50 nm to approximately 300 nm, or for example is particularly preferably in a range from about 80 nm to approximately 200 nm. In exemplary embodiment 400E, the slot waveguide 123 comprises a previously determined width 400-9 or $w_{rail}$, which is, for example, preferably in a range from approximately 80 nm to approximately 400 nm, or for example is particularly preferred in a range from approximately 140 to approximately 280 nm.

Subfigure 4F shows a plan view of an embodiment 400F of a capacitively coupled SOH modulator with a sub-wavelength grating waveguide 126 embodied as a slot waveguide. Furthermore, the slot waveguide 126 can also be designed as a "sub-wavelength grating" structure in accordance with subfigure 3A of FIG. 3-1, see subfigure 4F for a plan view. The slotted SWG waveguide core 126 allows a strong interaction of a light guided therein with the electro-optical material of the first casing region 130. In exemplary embodiment 400F, the slot in the slot waveguide 126 comprises a predetermined width 400-8 or wslot, which is, for example, preferably in a range from about 50 nm to approximately 300 nm, or for example is particularly preferably in a range from about 80 nm to approximately 200 nm. In exemplary embodiment 400F, the slot in the slot waveguide 126 comprises a predetermined width 400-9 or $w_{rail}$, which is, for example, preferably in a range from approximately 80 nm to approximately 400 nm, or for example is particularly preferred in a range from approximately 140 nm to approximately 280 nm.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCES

[1] C. Koos, J. Leuthold, and W. Freude, "Electro-optical high index contrast waveguide component", DE 10 2006 045 102 B4, 6 Jan. 2011.
[2] S Suzuki, "Electro-optical element," WO 2011 025 051 A1, March 2011.
[3] C. Koos, J. Leuthold, W. Freude, and J. M. Brosi, "Electro-optical high index contrast waveguide device," US 8 081 851 B2, 20 Dec. 2011.
[4] C. Koos, J. Brosi, M. Waldow, W. Freude, and J. Leuthold, "Silicon-on-insulator modulators for next-generation 100 Gbit/s-ethernet," in 33$^{rd}$ *European Conference and Exhibition of Optical Communication (ECOC)*, Berlin, Germany, 2007.
[5] J. Leuthold et al., "Silicon organic hybrid technology—A platform for practical nonlinear optics," *Proc. IEEE*, vol. 97, no. 7, pp. 1304-1316, July 2009.
[6] J. Leuthold et al., "Silicon-organic hybrid electro-optical devices," *IEEE I. Sel. Topics Quantum Electron.*, vol. 19, no. 6, pp. 114-126, Nov. 2013.
[7] S Dogru and N. Dagli, "Ultra-Low Voltage Wide Bandwidth Electro-optic Modulators," in *CLEO: Science and Innovations*, 2014, p. STu1G.1.
[8] N. Dagli, "Sub-volt drive 100 GHz bandwidth electro-optic modulator," WO 2014 201 269 A, 18 Dec. 2014.
[9] S Yokoyama, "Electro-optic element," US 2016 0 313 579 A1, October 2016.
[10] A. Tsarev, et al., "Polymer electro-optic modulator efficiency enhancement by the high permittivity dielectric strips," *Photonics and Nanostructures—Fundamentals and Applications*, April 2017.
[11] R. Palmer et al., "Low-loss silicon strip-to-slot mode converters," *IEEE Photon. J.*, vol. 5, no. 1, pp. 2200409-2200409, February 2013.

LIST OF REFERENCE SIGNS

100A-F Embodiments of devices according to the invention.
110 Optical waveguide with at least partially electro-optical properties.
120 One-piece waveguide core preferably made of high refractive index material.
121 Two-part waveguide core (slot waveguide), preferably of high refractive index material.
122 Single or multipart waveguide core, preferably of high refractive index material, which directly adjoins the second casing region of the waveguide.
123 Two-part waveguide core (slot waveguide), preferably of a material with a high refractive index, which is connected to at least one electrode via transparent or translucent, electrically conductive line regions.
124 Waveguide core, which is connected to at least one electrode via one or more transparent or translucent, electrically conductive line regions.
125 Strip waveguide with a waveguide core in sub-wavelength grating configuration, preferably of high refractive material.
126 Two-part waveguide core (slot waveguide), in sub-wavelength grating configuration, preferably of high refractive index material.
130 First casing region of the waveguide, which has at least partially electro-optical properties.
140 Second casing region consisting of dielectric material with high permittivity
150 Electrically conductive line regions, preferably realized as metal electrodes.
151 Transparent, electrically conductive line regions.
152 Electrically conductive line regions, preferably realized as metal electrodes.
153 Electrically conductive line regions electrically conductively connected to a portion of the waveguide core to apply a poling voltage. (Poling electrode).
160 Lower casing layer of the waveguide, preferably low-refractive-index material on a planar semiconductor substrate.
170 One or more cover layers.
180 Semiconductor layer for mechanical stabilization of the substrate.
190 Strip waveguide, as a transport waveguide for coupling the modulator.
191 A converter structure for converting the optical mode of the strip waveguide into the optical mode of the slot waveguide.
200A-E Embodiments of capacitively coupled phase modulators based on a slot waveguide.
201 Modulation range of the phase modulator.
300A/B Embodiments of capacitively coupled SOH phase modulators based on a slot waveguide.
300C/D Graphics of simulations of the $E_x$ component of the optical field in the slot waveguide core 121 and the $E_x$ component of the electrical modulation field at 40 GHz.

400A-F Further embodiments of capacitively coupled SOH modulators.

400-1 Height $h_{metal}$ of the electrically conductive line or metal electrodes 150.

400-2 Height $h_{dielectric}$ of the second casing region 140, which comprises at least one dielectric material or is formed therefrom.

400-3 Height $h_{silicon}$ of the waveguide core 120, which is or has been at least partially formed from silicon.

400-4 Height $h_{slab}$ of the transparent, electrically conductive region 151, which at least partially provides an electrically conductive connection between one of the two electrically conductive line regions 150 and the slot waveguide core 123.

400-5 Width $w_{strip}$ of the waveguide core 120 or 125, which at least partially comprises silicon or is formed therefrom.

400-6 Width $w_{gap}$ of the first casing region 130, which at least partially comprises an electro-optical material or is formed therefrom.

400-7 Width $w_{dielectric}$ of the second casing region 140, which at least partially comprises a dielectric material or is formed therefrom.

400-8 Width $w_{slot}$ of the slot waveguide core 123 or 126, wherein the intermediate space of this slot waveguide core 123 or 126 is at least partially filled by means of the first casing region 130.

400-9 Width $w_{rail}$ of the slot waveguide core 123 or 126.

What is claimed is:

1. A waveguide component, comprising:
   a waveguide, which is at least partially transparent or translucent with respect to light and is set up in such a way that light can be conducted at least partially through the waveguide, the waveguide comprising:
     a waveguide core, wherein the waveguide core is formed from one or more spatially separated elements comprising or formed from at least one waveguide core material;
     a first casing region comprising or formed from at least one electro-optical material, wherein the first casing region interacts at least partially with light guided in the waveguide, and wherein the first casing region is disposed at least partially around the one or more elements of the waveguide core; and
     a second casing region comprising or formed from at least one dielectric material, wherein the second casing region is arranged at least partially around the first casing region and/or the waveguide core; and
   at least two line regions, which are at least partially electrically conductive,
   wherein the line regions are configured to have an electrical modulation signal applied between the line regions,
   wherein the line regions are arranged at least partially along the optical waveguide in such a way that the line regions are opposite one another and the waveguide is arranged at least partially between the line regions;
   wherein the modulation signal forms an electric field having field lines, which at least partially penetrate both the second casing region and the first casing region, and
   wherein the dielectric material of the second casing region has a higher electrical refractive index in the frequency range of the modulation signal than the electro-optical material of the first casing region.

2. The waveguide component according to claim 1, wherein the electrical refractive index of the dielectric material in the second casing region at a frequency of the modulation signal of 10 GHz is more than a factor of 1.8 higher than the electrical refractive index of the electro-optical material of the first casing region.

3. The waveguide component according to claim 1, wherein the dielectric material of the second casing region has an electrical refractive index of in a range of 3.5 to 25 in a frequency range of a modulation signal between 5 GHz and 40 GHz.

4. The waveguide component according to claim 1, wherein the electric refractive index of the waveguide core is higher than the electric refractive index of the first casing region.

5. The waveguide component according to claim 1, wherein the electric refractive index of the waveguide core is at least 3.

6. The waveguide component according to claim 1, wherein the electric refractive index of the electro-optical material in the first casing region is at most 9.

7. The waveguide component according to claim 1, wherein the waveguide component comprises a lateral structuring, wherein initially the waveguide core, the line regions and at least the dielectric material of the second casing region are formed in a planar arrangement, onto which electro-optically active material is then applied.

8. The waveguide component according to claim 1, wherein the waveguide core, the first casing region, the second casing region and the line regions are arranged at least partially side by side on a common substrate.

9. The waveguide component according to claim 1, wherein the waveguide core has at least partially electro-optical properties.

10. The waveguide component according to claim 1, wherein the waveguide core is formed as a slot waveguide.

11. The waveguide component according to claim 10, wherein the difference between the optical refractive index of the waveguide core and that of the first casing region in the slot waveguide is more than 0.5 or more than 1.0 or more than 1.5.

12. The waveguide component according to claim 1, wherein the second casing region at least partially directly adjoins the electrically conductive line regions.

13. The waveguide component according to claim 1, wherein the second casing region at least partially directly adjoins the first casing region.

14. The waveguide component according to claim 1, wherein the second casing region at least partially directly adjoins the waveguide core.

15. The waveguide component according to claim 1, wherein the waveguide core is electrically conductively connected at least partially via the line region to the line region.

16. The waveguide component according to claim 1, wherein the waveguide component additionally has at least one electrically conductive line region or contact, which is at least partially electrically conductively connected to the waveguide core.

17. The waveguide component according to claim 1, wherein the concentration of free charge carriers is at least in the waveguide core less than $10^{19}$ cm$^{-3}$.

18. The waveguide component according to claim 1, wherein the dielectric material in the second casing region is transparent or translucent to light and is configured in such a way that light can be conducted at least partially through the second casing region.

19. The waveguide component according to claim 1, wherein the dielectric material of the second casing region comprises at least partially an organic material or is formed therefrom.

20. The waveguide component according to claim 1, wherein the second casing region comprises at least one material from a group of dielectric materials or is formed therefrom, wherein the group of dielectric materials comprises: $Al_2O_3$, $ZrO_2$, $ZrSiO_4$, $HfO_2$, $HfSiO_4$, $Pr_2O_3$, $Gd_2O_3$, $Y_2O_3$, $La_2O_3$, $Ta_2O_5$, $TiO_2$, $BaTiO_3$, $SrTiO_3$, $BaSrTiO_3$ or combinations thereof.

21. The waveguide component according to claim 1, wherein the waveguide at least partially comprises silicon or is formed therefrom.

22. The waveguide component according to claim 1, wherein the waveguide component comprises at least one substrate, which at least partially comprises $SiO_2$ or is formed therefrom.

23. The waveguide component according to claim 1, wherein the electro-optical material of the first casing region comprises at least partially an organic material or is formed therefrom.

24. The waveguide component according to claim 1, wherein the electro-optical material of the first casing region comprises at least partially a ferroelectric material or is formed therefrom.

25. The waveguide component according to claim 1, wherein the waveguide core comprises elements with a maximum dimension below the material wavelength or below half the material wavelength of the waveguide core material.

26. The waveguide component according to claim 1, wherein the waveguide is formed at least partially by means of photonic crystals or comprises such crystals.

* * * * *